United States Patent
Maeda et al.

(10) Patent No.: US 8,466,985 B2
(45) Date of Patent: Jun. 18, 2013

(54) INFORMATION RECORDING APPARATUS, IMAGING APPARATUS, INFORMATION RECORDING METHOD AND MEDIUM STORING A PROGRAM GENERATING A TRANSPORT DATA STREAM AND UTILIZING A MODIFIED DIGITAL VIDEO PACK

(75) Inventors: Tetsuhiro Maeda, Kanagawa (JP); Atsushi Mae, Kanagawa (JP); Yukio Isobe, Kanagawa (JP); Naoki Morimoto, Tokyo (JP); Kenichiro Nagao, Tokyo (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 12/505,735

(22) Filed: Jul. 20, 2009

(65) Prior Publication Data

US 2010/0033589 A1 Feb. 11, 2010

(30) Foreign Application Priority Data

Aug. 11, 2008 (JP) .................................. 2008-206954

(51) Int. Cl.
*H04N 5/76* (2006.01)
(52) U.S. Cl.
USPC ...................................... 348/231.3; 386/227
(58) Field of Classification Search
None
See application file for complete search history.

(56) References Cited

U.S. PATENT DOCUMENTS

| | | | |
|---|---|---|---|
| 2002/0106189 A1* | 8/2002 | Sato et al. | 386/65 |
| 2004/0114042 A1 | 6/2004 | Paolini et al. | |
| 2004/0221227 A1* | 11/2004 | Wu | 715/512 |
| 2004/0240561 A1* | 12/2004 | Crinon | 375/240.26 |
| 2007/0297769 A1* | 12/2007 | Mae et al. | 386/112 |
| 2009/0052875 A1* | 2/2009 | Morimoto et al. | 386/131 |
| 2009/0136145 A1* | 5/2009 | Morimoto et al. | 382/233 |
| 2009/0279842 A1* | 11/2009 | Liao et al. | 386/69 |

FOREIGN PATENT DOCUMENTS

| | | |
|---|---|---|
| JP | 7-64169 | 3/1995 |
| JP | 2003-209785 | 7/2003 |
| JP | 2004-201100 | 7/2004 |
| JP | 2005-051278 | 2/2005 |
| JP | 2006-60746 | 3/2006 |
| JP | 2007-312246 | 11/2007 |

(Continued)

OTHER PUBLICATIONS www.avchd-info.org website, archived version from Jun. 13, 2008 obtained via archive.org.*

(Continued)

*Primary Examiner* — Nelson D. Hernández Hernández
*Assistant Examiner* — Dennis Hogue
(74) *Attorney, Agent, or Firm* — Oblon, Spivak, McClelland, Maier & Neustadt, L.L.P.

(57) ABSTRACT

An information recording apparatus includes: a moving image input unit configured to input a moving image; a position information obtaining unit configured to obtain position information at the time of the moving image being input; a position information converting unit configured to convert the obtained position information into at least either bitmap data or text data, relating to a place determined with the position information thereof; a data stream generating unit configured to generate a data stream including at least either the converted bitmap data or text data, and video data corresponding to the input moving image; and a recording control unit configured to record the generated data stream as a moving image file.

12 Claims, 29 Drawing Sheets

FOREIGN PATENT DOCUMENTS

| | | |
|---|---|---|
| JP | 2008-34927 | 2/2008 |
| JP | 2008047983 A * | 2/2008 |
| JP | 2008-67117 | 3/2008 |
| JP | 2008-91977 | 4/2008 |
| WO | WO 2007055205 A1 * | 5/2007 |
| WO | WO 2007/097271 A1 | 8/2007 |
| WO | WO 2007/129652 A1 | 11/2007 |
| WO | WO 2008/018618 A1 | 2/2008 |
| WO | WO 2008/032739 A1 | 3/2008 |

OTHER PUBLICATIONS www.avchd-info.org website, wepage retrieved on Aug. 27, 2012.*

U.S. Appl. No. 12/510,754, filed Jul. 28, 2009, Maeda, et al.

European Search Report issued Nov. 26, 2010, in Application No. / Patent No. 09167535.5-1522 / 2154547.

* cited by examiner

FIG. 3

| MANAGEMENT NUMBER ~161 | POSITION INFORMATION (GPS INFORMATION) ~162 | | PLACE NAME (TEXT DATA) ~163 | PLACE NAME (BITMAP DATA) ~164 |
|---|---|---|---|---|
| 1 | 1 | LATITUDE: ···° ···' ···. ···"<br>LONGITUDE: ···° ···' ···. ···" | LONG ISLAND | LONG ISLAND |
| | 2 | LATITUDE: ···° ···' ···. ···"<br>LONGITUDE: ···° ···' ···. ···" | | |
| | ⋮ | ⋮ | | |
| 2 | 1 | LATITUDE: ···° ···' ···. ···"<br>LONGITUDE: ···° ···' ···. ···" | BROOKLYN | BROOKLYN |
| | 2 | LATITUDE: ···° ···' ···. ···"<br>LONGITUDE: ···° ···' ···. ···" | | |
| | ⋮ | ⋮ | | |
| 3 | 1 | LATITUDE: ···° ···' ···. ···"<br>LONGITUDE: ···° ···' ···. ···" | MANHATTAN | MANHATTAN |
| | 2 | LATITUDE: ···° ···' ···. ···"<br>LONGITUDE: ···° ···' ···. ···" | | |
| | ⋮ | ⋮ | | |
| ⋮ | ⋮ | | ⋮ | ⋮ |

| FILE TYPE | MAXIMUM NUMBER | ROLE |
|---|---|---|
| index | 1 | BASIC FILE FOR MANAGING THE WHOLE MEDIA. CORRELATIONSHIP BETWEEN A TITLE SHOWN TO USER AND THE Movie Object FILE IS MANAGED. WITH THE AVCHD FORMAT, THE PLAYBACK ORDER OF A PLAYLIST FILE TO BE MANAGED WITH THE Movie Object FILE IS MANAGED WITHIN THE META DATA OF THE index FILE. |
| Movie Object | 1 | FILE FOR MANAGING THE PLAYLIST TO BE PLAYED AT THE TIME OF A TITLE BEING SPECIFIED WITH THE BD-ROM FORMAT. HOWEVER, THE PRESENT FILE IS NOT REFERENCED WITH THE AVCHD FORMAT, AND CORRELATION BETWEEN THE PLAYLIST AND TITLE IS MANAGED WITH THE META DATA WITHIN index FILE. |
| Real PlayList | 2000 IN TOTAL | PLAYLIST FILE FOR ORIGINAL TITLE. RECORDED AND IMAGED VIDEO IS REGISTERED IN RECORDING ORDER. |
| Virtual PlayList | | PLAYLIST FILE FOR CREATING A PLAY LIST DEFINED BY A USER THROUGH NONDESTRUCTIVE EDITING. A Clip FILE REGISTERED ON ANY REAL PLAYLIST IS SPECIFIED AND PLAYED WITHOUT HAVING THE Clip FILE PECULIAR TO THE VIRTUAL PLAYLIST. |
| Clip Information | 4000 | PROVIDED IN COMBINATION WITH THE Clip AV Stream FILE, IN WHICH INFORMATION RELATING TO A STREAM NECESSARY FOR PLAYING A REAL STREAM FILE IS DESCRIBED. |
| Clip AV Stream | 4000 | FILE IN WHICH A STREAM RECORDED WITH MPEG2-TS IS STORED. AVCHD IMAGE DATA IS STORED IN THIS FILE. |

FIG. 9

| SYNTAX | BIT LENGTH | OVERVIEW |
|---|---|---|
| user_data_unregistered(payloadSize) { | | |
|     uuid_iso_iec_11578 | 128 | UNIVERSALLY UNIQUE IDENTIFIER |
|     TypeIndicator | 32 | DATA TYPE |
|     if (type_indicator == 0x4741 3934) { | | |
|         cc_data() | | cc_data() STRUCTURE |
|     else if (type_indicator == 0x4D44 504D) { | | |
|         ModifiedDVPackMeta() { | | ModifiedDVPackMeta() STRUCTURE |
|             number_of_modified_dv_pack_entries | 8 | NUMBER OF ENTRIES |
|             for (i=0;<br>                i<number_of_modified_dv_pack_entries;<br>                i++) { | | |
|                 one_modified_dv_pack() { | | one_modified_dv_pack() STRUCTURE |
|                     mdp_id | 8 | Modified DV Pack ID |
|                     mdp_data | 32 | Modified DV Pack DATA |
|                 } | | |
|             } | | |
|     } | | |
| } | | |

FIG. 10

| mdp_id | VARIABLE NAME | CONTENT |
|---|---|---|
| 0x13 | TIME CODE | TIME CODE |
| 0x14 | BINARY GROUP | BINARY GROUP |
| 0x18 | REC TIME&DATE1 | IMAGED DATE AND TIME 1 |
| 0x19 | REC TIME&DATE2 | IMAGED DATE AND TIME 2 |
| 0x70 | CONSUMER CAMERA1 | CONSUMER CAMERA 1 |
| 0x71 | CONSUMER CAMERA2 | CONSUMER CAMERA 2 |
| 0x73 | LENS | LENS |
| 0x74 | GAIN | GAIN |
| 0x75 | PEDESTAL | PEDESTAL |
| 0x76 | GAMMA | GAMMA |
| 0x77 | DETAIL | EDGE ENHANCEMENT |
| 0x7B | CAMERA PRESET | CAMERA PRESET |
| 0x7C | FLARE | FLARE |
| 0x7D | SHADING | SHADING |
| 0x7E | KNEE | KNEE |
| 0x7F | SHUTTER | SHUTTER |
| 0xA0 | EXPOSURE TIME | EXPOSURE TIME |
| 0xA1 | F NUMBER | F VALUE |
| 0xA2 | EXPOSURE PROGRAM | EXPOSURE PROGRAM |
| 0xA3 | BRIGHTNESS VALUE | BRIGHTNESS VALUE |
| 0xA4 | EXPOSURE BIAS VALUE | EXPOSURE BIAS VALUE |
| 0xA5 | MAX APERTURE VALUE | MAXIMUM APERTURE |
| 0xA6 | FLASH | FLASH |
| 0xA7 | CUSTOM RENDERED | SPECIAL PROCESS |
| 0xA8 | WHITE BALANCE | WHITE BALANCE |
| 0xA9 | FOCAL LENGTH IN 35MM FILM | FOCAL LENGTH (35-mm FILM) |
| 0xAA | SCENE CAPTURE TYPE | IMAGED SCENE TYPE |
| 0xAB \| 0xAF | EXIF OPTION | Exif OPTION |

FIG. 11

| mdp_id | VARIABLE NAME | CONTENT |
|---|---|---|
| 0xB0 | GPS VERSION | VERSION OF GPS TAG |
| 0xB1 | GPS LATITUDE REF | NORTH LATITUDE AND SOUTH LATITUDE INFORMATION |
| 0xB2 | GPS LATITUDE1 | DEGREES OF LATITUDE |
| 0xB3 | GPS LATITUDE2 | MINUTES OF LATITUDE |
| 0xB4 | GPS LATITUDE3 | SECONDS OF LATITUDE |
| 0xB5 | GPS LONGITUDE REF | EAST LONGITUDE AND WEST LONGITUDE INFORMATION |
| 0xB6 | GPS LONGITUDE1 | DEGREES OF LONGITUDE |
| 0xB7 | GPS LONGITUDE2 | MINUTES OF LONGITUDE |
| 0xB8 | GPS LONGITUDE3 | SECONDS OF LONGITUDE |
| 0xB9 | GPS ALTITUDE REF | ALTITUDE DATUM |
| 0xBA | GPS ALTITUDE | METERS OF ALTITUDE |
| 0xBB | GPS TIMESTAMP1 | HOURS OF GPS TIME |
| 0xBC | GPS TIMESTAMP2 | MINUTES OF GPS TIME |
| 0xBD | GPS TIMESTAMP3 | SECONDS OF GPS TIME |
| 0xBE | GPS STATUS | STATE OF GPS RECEIVER |
| 0xBF | GPS MEASURE MODE | GPS POSITIONING METHOD |
| 0xC0 | GPS DOP | RELIABILITY OF POSITIONING |
| 0xC1 | GPS SPEED REF | INCREMENTS OF SPEED |
| 0xC2 | GPS SPEED | SPEED |
| 0xC3 | GPS TRACK REF | INCREMENTS OF ADVANCING DIRECTION |
| 0xC4 | GPS TRACK | ADVANCING DIRECTION |
| 0xC5 | GPS IMG DIRECTION REF | INCREMENTS OF VIDEO DIRECTION OF IMAGED IMAGE |
| 0xC6 | GPS IMG DIRECTION | VIDEO DIRECTION OF IMAGED IMAGE |
| 0xC7 | GPS MAP DATUM1 | MAP DATA 1 USED FOR POSITIONING |
| 0xC8 | GPS MAP DATUM2 | MAP DATA 2 USED FOR POSITIONING |
| 0xC9 \| 0xCF | GPS OPTION | GPS OPTION |
| 0xE0 | MAKER & MODEL ID | MAKER AND MODEL IDS |
| 0xE1 \| 0xEF | MAKER OPTION | MAKER OPTION |
| Other values | Reserved | (RESERVED) |

FIG. 12A

| SYNTAX | BIT LENGTH | OVERVIEW |
|---|---|---|
| BitmapUnit() { | | |
| UnitDescriptor() | 24 | UnitDescriptor() STRUCTURE |
| UnitData() | | UnitData() STRUCTURE |
| } | | |

FIG. 12B

| SYNTAX | BIT LENGTH | OVERVIEW |
|---|---|---|
| UnitDescriptor() { | | |
| UnitType | 8 | UNIT TYPE |
| UnitLength | 16 | DATA LENGTH |
| } | | |

FIG. 13

| UnitType | UNIT NAME | OVERVIEW |
|---|---|---|
| 0x00–0x13 | (RESERVED) | |
| 0x14 | Palette Unit | COLOR OF EACH PIXEL, TRANSPARENCY INFORMATION TABLE, ETC. |
| 0x15 | Object Unit | POSITION AND SIZE INFORMATION OF BITMAP DATA BODY, ETC. |
| 0x16 | Overlay Bitmap Compilation Unit | CORRELATION INFORMATION BETWEEN TYPE AND OBJECT OF DISPLAY INFORMATION, AND WINDOW, ETC. |
| 0x17 | Window Unit | INFORMATION RELATING TO DISPLAY SECTION WITHIN SCREEN, ETC. |
| 0x18 | Menu Bitmap Compilation Unit | CORRELATION INFORMATION BETWEEN TYPE AND OBJECT OF DISPLAY INFORMATION, AND WINDOW, BUTTON INFORMATION, ETC. |
| 0x19–0x7F | (RESERVED) | |
| 0x80 | End Unit | END INFORMATION OF DISPLAY INCREMENTS |
| 0x81–0xFF | (RESERVED) | |

FIG. 14A

| SYNTAX | BIT LENGTH | OVERVIEW |
|---|---|---|
| ObjectUnit() { | | |
|     UnitDescriptor() | 24 | UnitDescriptor() STRUCTURE |
|     ObjectID | 16 | OBJECT ID |
|     ObjectVersionNumber | 8 | OBJECT VERSION NUMBER |
|     SequenceDescriptor() | | SequenceDescriptor() STRUCTURE |
|     ObjectData() | | ObjectData() STRUCTURE |
| } | | |

FIG. 14B

| SYNTAX | BIT LENGTH | OVERVIEW |
|---|---|---|
| ObjectData() { | | |
|     ObjectDataLength | 24 | OBJECT DATA LENGTH |
|     ObjectWidth | 16 | OBJECT WIDTH |
|     ObjectHeight | 16 | OBJECT HEIGHT |
|     while (process_lengh < ObjectDataLength) { | | |
|         RunLengthEncodedLine() | | BITMAP DATA |
|     } | | |
| } | | |

FIG. 15

| SYNTAX | BIT LENGTH | OVERVIEW |
|---|---|---|
| zzzzz. clpi { | | |
|     type_indicator | 8 * 4 | FILE TYPE |
|     version_number | 8 * 4 | FILE VERSION |
|     SequenceInfo_start_adress | 32 | SequenceInfo() START ADDRESS |
|     ProgramInfo_start_adress | 32 | ProgramInfo() START ADDRESS |
|     CPI_start_adress | 32 | CPI() START ADDRESS |
|     ClipMark_start_adress | 32 | ClipMark() START ADDRESS |
|     ExtensionData_start_adress | 32 | ExtensionData() START ADDRESS |
|     reserved_for_future_use | 96 | RESERVED AREA |
|     ClipInfo() | | ClipInfo() STRUCTURE |
|     for (i=0; i<N1; i++) { | | |
|         padding_word | 16 | PADDING AREA |
|     } | | |
|     SequenceInfo() | | SequenceInfo() STRUCTURE |
|     for (i=0; i<N2; i++) { | | |
|         padding_word | 16 | PADDING AREA |
|     } | | |
|     ProgramInfo() | | ProgramInfo() STRUCTURE |
|     for (i=0; i<N3; i++) { | | |
|         padding_word | 16 | PADDING AREA |
|     } | | |
|     CPI() | | CPI() STRUCTURE |
|     for (i=0; i<N4; i++) { | | |
|         padding_word | 16 | PADDING AREA |
|     } | | |
|     ClipMark() | | ClipMark() STRUCTURE |
|     for (i=0; i<N5; i++) { | | |
|         padding_word | 16 | PADDING AREA |
|     } | | |
|     ExtensionData() | | ExtensionData() STRUCTURE |
|     for (i=0; i<N6; i++) { | | |
|         padding_word | 16 | PADDING AREA |
|     } | | |
| } | | |

FIG. 16

| SYNTAX | BIT LENGTH | OVERVIEW |
|---|---|---|
| ClipExtensionData() { | | |
|     type_indicator | 8 * 4 | BLOCK TYPE |
|     reserved | 8 * 4 | RESERVED AREA |
|     ProgramInfoExt_start_adress | 32 | ProgramInfoExt() START ADDRESS |
|     MakersPrivateData_start_adress | 32 | MakersPrivateData() START ADDRESS |
|     reserved_for_future_use | 192 | RESERVED AREA |
|     ClipInfoExt() | | ClipInfoExt() STRUCTURE |
|     for (i=0; i<N1; i++) { | | |
|         padding_word | 16 | PADDING AREA |
|     } | | |
|     ProgramInfoExt() | | ProgramInfoExt() STRUCTURE |
|     for (i=0; i<N2; i++) { | | |
|         padding_word | 16 | PADDING AREA |
|     } | | |
|     MakersPrivateData() | | MakersPrivateData() STRUCTURE |
|     for (i=0; i<N3; i++) { | | |
|         padding_word | 16 | PADDING AREA |
|     } | | |
| } | | |

FIG. 17

| SYNTAX | BIT LENGTH | OVERVIEW |
| --- | --- | --- |
| MakersPrivateData() { | | |
|    length | 32 | DATA LENGTH |
|    if (length !=0) { | | |
|      data_block_start_adress | 32 | data_block() START ADDRESS |
|      reserved_for_word_align | 24 | RESERVED AREA FOR ALIGNMENT |
|      number_of_maker_entries | 8 | NUMBER OF MAKER ENTRIES |
|      for (i=0;<number_of_maker_entries; i++) { | | |
|        maker_ID | 16 | MAKER ID |
|        maker_model_code | 16 | MAKER MODEL CODE |
|        mpd_start_address | 32 | mpd_start() START ADDRESS |
|        mpd_length | 32 | DATA LENGTH OF mpd |
|      } | | |
|      for (i=0; i<L1; i++) { | | |
|        padding_word | 16 | PADDING AREA |
|        padding_word | 16 | PADDING AREA |
|      } | | |
|      data_block() | 32+ 8 * (length- data_block_start_ address) | |
|    } | | |
| } | | |

FIG. 18A

| VARIABLE NAME | BIT LENGTH | CONTENT |
|---|---|---|
| GPS TEXT DATA | 8 * 256 | TEXT DATA OF WHICH THE GPS INFORMATION HAS BEEN CHANGED |

FIG. 18B

| VARIABLE NAME | BIT LENGTH | CONTENT |
|---|---|---|
| GPS VERSION | 4 | VERSION OF GPS TAG |
| GPS LATITUDE REF | 2 | NORTH LATITUDE AND SOUTH LATITUDE INFORMATION |
| GPS LATITUDE1 | 4 | DEGREES OF LATITUDE |
| GPS LATITUDE2 | 4 | MINUTES OF LATITUDE |
| GPS LATITUDE3 | 4 | SECONDS OF LATITUDE |
| GPS LONGITUDE REF | 2 | EAST LONGITUDE AND WEST LONGITUDE INFORMATION |
| GPS LONGITUDE1 | 4 | DEGREES OF LONGITUDE |
| GPS LONGITUDE2 | 4 | MINUTES OF LONGITUDE |
| GPS LONGITUDE3 | 4 | SECONDS OF LONGITUDE |
| GPS ALTITUDE REF | 1 | ALTITUDE DATUM |
| GPS ALTITUDE | 4 | METERS OF ALTITUDE |
| GPS TIMESTAMP1 | 4 | HOURS OF GPS TIME |
| GPS TIMESTAMP2 | 4 | MINUTES OF GPS TIME |
| GPS TIMESTAMP3 | 4 | SECONDS OF GPS TIME |
| GPS STATUS | 2 | STATE OF GPS RECEIVER |
| GPS MEASURE MODE | 2 | GPS POSITIONING METHOD |
| GPS DOP | 4 | RELIABILITY OF POSITIONING |
| GPS SPEED REF | 2 | INCREMENTS OF SPEED |
| GPS SPEED | 4 | SPEED |
| GPS TRACK REF | 2 | INCREMENTS OF ADVANCING DIRECTION |
| GPS TRACK | 4 | ADVANCING DIRECTION |
| GPS IMG DIRECTION REF | 2 | INCREMENTS OF VIDEO DIRECTION OF IMAGED IMAGE |
| GPS IMG DIRECTION | 4 | VIDEO DIRECTION OF IMAGED IMAGE |
| GPS MAP DATUM | 8 | MAP DATA USED FOR POSITIONING |

FIG. 19

| SYNTAX | BIT LENGTH | OVERVIEW |
|---|---|---|
| ExtensionData() { | | |
|    length | 32 | DATA LENGTH |
|    if (length !=0) { | | |
|      data_block_start_adress | 32 | Data_block() START ADDRESS |
|      reserved_for_word_align | 24 | RESERVED AREA FOR ALIGNMENT |
|      number_of_ext_data_entries | 8 | NUMBER OF EXTENSION DATA ENTRIES |
|      for (i=0;<number_of_ext_data_entries; i++) { | | |
|        ext_data_entry() { | | |
|          ID1 | 16 | ID1 |
|          ID2 | 16 | ID2 |
|          ext_data_start_address | 32 | ext_data_start() START ADDRESS |
|          ext_data_length | 32 | DATA LENGTH OF ext_data |
|        } | | |
|      } | | |
|      for (i=0; i<L1; i++) { | | |
|        padding_word | 16 | PADDING AREA |
|        padding_word | 16 | PADDING AREA |
|      } | | |
|      data_block() | 32+ 8 * (length- data_block_start_ address) | |
|    } | | |
| } | | |

FIG. 20

| SYNTAX | BIT LENGTH | OVERVIEW |
|---|---|---|
| blkPlayListMarkExt() { | | |
|   Length | 32 | DATA LENGTH |
|   NumberOfPlayListMarks | 16 | NUMBER OF MARKS |
|   for (PL_mark_id=0;<br>      PL_mark_id<NumberOfPlayListMarks;<br>      PL_mark_id++) { | | |
|     blkMarkExtension() { | | blkMarkExtension() STRUCTURE |
|       MakerID | 16 | MAKER ID |
|       MakerModelCode | 16 | MAKER MODEL CODE |
|       reserved | 29 | RESERVED AREA |
|       Pulldown | 2 | PULLDOWN |
|       MarkWriteProtectFlag | 1 | MARK WRITE PROTECT FLAG |
|       RefToMarkThumbnailIndex | 16 | THUMBNAIL REFERENCE |
|       blkTimeZone() | 8 | blkTimeZone() STRUCTURE |
|       RecordTimeAndDate | 4*14 | IMAGED DATE AND TIME |
|       MarkCharacterSet | 8 | MARK CHARACTER SET |
|       MarkNameLength | 8 | MARK NAME LENGTH |
|       MarkName | 8*24 | MARK NAME |
|       MakersInformation | 8*16 | MAKER INFORMATION |
|       blkTimeCode() | 8 | blkTimeCode() STRUCTURE |
|       reserved | 16 | RESERVED AREA |
|     } | | |
|   } | | |
| } | | |

INFORMATION RECORDING APPARATUS, IMAGING APPARATUS, INFORMATION RECORDING METHOD AND MEDIUM STORING A PROGRAM GENERATING A TRANSPORT DATA STREAM AND UTILIZING A MODIFIED DIGITAL VIDEO PACK

BACKGROUND OF THE INVENTION

1. Field of the Invention

The present invention relates to an information recording apparatus, and specifically relates to an information recording apparatus, an imaging apparatus, and an information recording method whereby position information can be obtained, and a program causing a computer to execute the method thereof.

2. Description of the Related Art

Heretofore, a camera has been proposed wherein position information is obtained by employing GPS (Global Positioning System), and this position information is added to a photo and recorded. For example, a camera with built-in GPS has been proposed wherein the name of the current place searched based on the current position obtained by employing the GPS is displayed, and upon a shutter button being pressed, the name of the current place is recorded in a photo (e.g., Japanese Unexamined Patent Application Publication No. 07-64169).

Also, in recent years, imaging apparatuses, such as digital still cameras, digital video cameras (single-unit camera recorders), and so forth, wherein an imaged image in which a subject such as a person or the like has been imaged is recorded as image data, have come into widespread use. Also, for example, a digital still camera has been proposed wherein position information is obtained by employing GPS, and this position information is added to an imaged image and recorded.

SUMMARY OF THE INVENTION

According to the above-mentioned related art, when displaying an imaged image recorded by an imaging apparatus, a user can employ position information to which an imaged image to be displayed is added. Thus, the user's convenience can be improved.

Now, let us consider a case where an imaged moving image recorded by an imaging apparatus is played by another playback apparatus. For example, in the case of another playback apparatus playing an imaged moving image to which position information has been added, the position information thereof can be employed at the time of playing the imaged moving image. For example, an arrangement can be conceived wherein a conversion database used for converting into a place name determined with position information is used to convert the position information into the place name, and this place name is displayed. However, the place name is not displayed with a playback apparatus which does not have such a conversion database, and accordingly, information relating to the place determined with the position information may not be used effectively.

It has been found to be desirable to provide an arrangement enabling readily using information relating to a place determined with position information relating to a moving image.

According to an embodiment of the present invention, there are provided an information recording apparatus including: a moving image input unit configured to input a moving image; a position information obtaining unit configured to obtain position information at the time of the moving image being input; a position information converting unit configured to convert the obtained position information into at least either bitmap data or text data, relating to a place determined with the position information thereof; a data stream generating unit configured to generate a data stream including at least either the converted bitmap data or text data, and video data corresponding to the input moving image; and a recording control unit configured to record the generated data stream as a moving image file, an information recording method corresponding thereto, and a program causing a computer to execute the method thereof. Thus, there is provided an advantage in that position information at the time of a moving image being input is obtained, this obtained position information is converted into at least either bitmap data or text data, a data stream including at least either the converted bitmap data or text data, and video data is generated, and the generated data stream is recorded as a moving image file.

Also, the position information converting unit may convert the obtained position information into text data relating to a place determined with the position information thereof, with the data stream generating unit generating the data stream by including the converted text data in a video stream corresponding to the video data. Thus, there is provided an advantage in that a data stream is generated by including converted text data in a video stream.

Also, the data stream generating unit may generate the data stream based on the video stream in which the converted text data is included in a modified digital video pack according to the AVCHD standard. Thus, there is provided an advantage in that a data stream is generated in accordance with the AVCHD standard based on a video stream in which text data is included in a modified digital video pack according to the AVCHD standard.

Also, the position information converting unit may convert the obtained position information into bitmap data relating to a place determined with the position information thereof, with the data stream generating unit generating the data stream by multiplexing a bitmap stream corresponding to the converted bitmap data, and a video stream corresponding to the video data. Thus, there is provided an advantage in that a data stream is generated by multiplexing a bitmap stream and a video stream.

Also, the bitmap stream may be a bitmap stream corresponding to an overlay bitmap according to the AVCHD standard, with the data stream generating unit generating the data stream by multiplexing the bitmap stream and the video stream in accordance with the AVCHD standard. Thus, there is provided an advantage in that a bitmap stream and a video stream are multiplexed in accordance with the AVCHD standard to generate a data stream.

Also, the position information converting unit may convert the obtained position information into bitmap data corresponding to at least one of a place name, a city name, a country name, a symbol mark, and numeric value information that represent a place determined with the position information thereof. Thus, there is provided an advantage in that obtained position information is converted into bitmap data corresponding to at least one of a place name, a city name, a country name, a symbol mark, and numeric value information.

Also, the position information converting unit may convert the obtained position information into text data corresponding to at least one of a place name, a city name, a country name, and numeric value information that represent a place determined with the position information thereof. Thus, there is provided an advantage in that obtained position information is converted into text data corresponding to at least one of a place name, a city name, a country name, and numeric value information that represent a place determined with the position information thereof.

Also, the position information converting unit may convert the obtained position information into at least one of bitmap data that indicates a map including a place determined with the position information thereof, with bitmap data in which an indicator that indicates the place thereof being drawn on a map including the place determined with the position information thereof. Thus, there is provided an advantage in that obtained position information is converted into at least one of bitmap data that indicates a map including a place determined with the position information thereof, and bitmap data in which an indicator that indicates the place thereof is drawn on a map including the place thereof.

Also, according to an embodiment of the present invention, there are provided an imaging apparatus including: an imaging unit configured to image a subject to generate an imaged moving image; a position information obtaining unit configured to obtain position information at the time of the imaged moving image being generated; a position information converting unit configured to convert the obtained position information into at least either bitmap data or text data, relating to a place determined with the position information thereof; a data stream generating unit configured to generate a data stream including at least either the converted bitmap data or text data, and video data corresponding to the generated imaged moving image; and a recording control unit configured to record the generated data stream as a moving image file, and also an information recording method corresponding thereto, and a program causing a computer to execute the method thereof. Thus, there is provided an advantage in that position information at the time of an imaged moving image being generated is obtained, this obtained position information is converted into at least either bitmap data or text data, a data stream including either the converted bitmap data or text data, and video data is generated, and this generated data stream is recorded as a moving image file.

According to the above configurations, an outstanding advantage is obtained in that information relating to a place determined with position information relating to a moving image can be readily used.

BRIEF DESCRIPTION OF THE DRAWINGS

FIG. 3 is a diagram schematically illustrating the content stored in a position information conversion database according to an embodiment of the present invention;

FIG. 5 is a diagram schematically illustrating correspondence relationship between the type of an AVCHD file and the role thereof;

FIG. 9 is a diagram illustrating the whole data structure of a modified digital video pack (MDP) according to the AVCHD standard;

FIG. 10 is a diagram illustrating correspondence relationship between the ID and accompanying information of the MDP according to the AVCHD standard;

FIG. 11 is a diagram illustrating correspondence relationship between the ID and accompanying information of the MDP according to the AVCHD standard;

FIGS. 12A and 12B are diagrams illustrating the data structure of a bitmap unit included in an overlay bitmap according to the AVCHD standard;

FIG. 13 is a diagram illustrating the type of the bitmap unit according to the AVCHD standard;

FIGS. 14A and 14B are diagrams illustrating the data structure of "Object Unit" according to the AVCHD standard;

FIG. 15 is a diagram illustrating the data structure of a clip information file according to the AVCHD standard;

FIG. 16 is a diagram illustrating the data structure of a block "ExtensionData( )" of the clip information file according to the AVCHD standard;

FIG. 17 is a diagram illustrating the data structure of a block "MakersPrivateData( )" of the clip information file according to the AVCHD standard;

FIGS. 18A and 18B are diagrams illustrating a data structure example defined with a block "data_block( )" of the clip information file according to the AVCHD standard;

FIG. 19 is a diagram illustrating the data structure of a block "ExtensionData( )" of a playlist file according to the AVCHD standard;

FIG. 20 is a diagram illustrating the data structure of a block "blkPlayListMarkExt( )" of the playlist file according to the AVCHD standard;

DESCRIPTION OF THE PREFERRED EMBODIMENTS

Next, an embodiment of the present invention will be described in detail with reference to the appended drawings.

Figure 1:
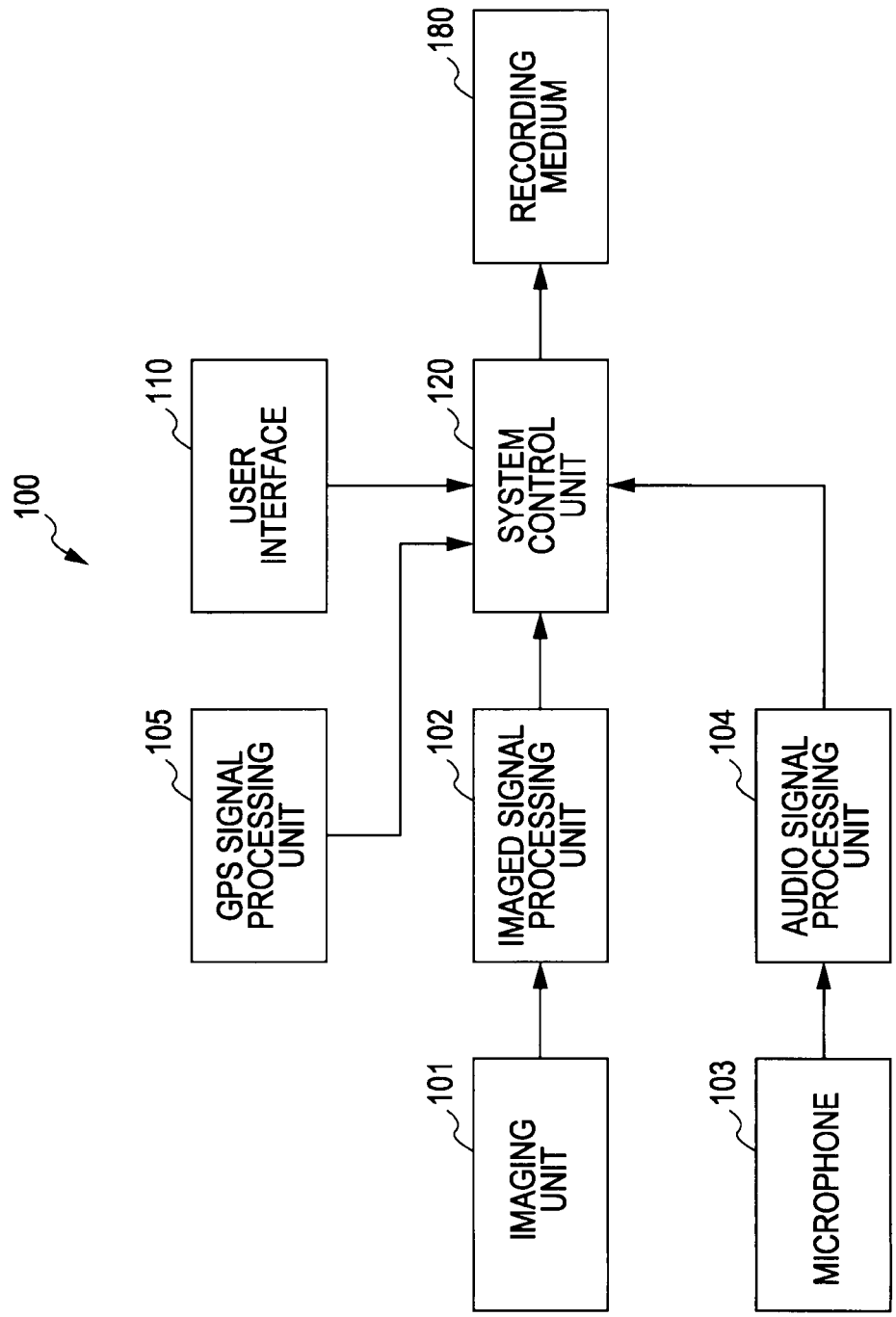
FIG. 1 is a block diagram illustrating a functional configuration example of an information recording apparatus 100 according to an embodiment of the present invention.

FIG. 1 is a block diagram illustrating a functional configuration example of an information recording apparatus 100 according to an embodiment of the present invention. The information recording apparatus 100 includes an imaging unit 101, an imaged signal processing unit 102, a microphone 103, an audio signal processing unit 104, a GPS signal processing unit 105, a user interface 110, a system control unit 120, and a recording medium 180. The information recording apparatus 100 can be realized with, for example, an imaging apparatus, such as a digital video camera or the like, which is capable of calculating position information by receiving a GPS signal, and recording the calculated position information in a manner correlated with an imaged moving image.

The imaging unit 101 includes an optical system and an imaging device. This optical system is configured of multiple lenses (zoom lens, focus lens (not shown), etc.) used for condensing light from a subject, a diaphragm (not shown), and so forth, and the incident light from the subject is supplied to the imaging device via these lenses and the diaphragm. This imaging device performs photoelectric conversion of the light from the subject input via the optical system to obtain an analog imaged signal (image signal), and outputs the analog imaged signal subjected to photoelectric conversion to the imaged signal processing unit 102. Note that, for example, a CCD (Charge Coupled Device) sensor, a CMOS (Complementary Metal Oxide Semiconductor) sensor, or the like can be used as the imaging device.

The imaged signal processing unit 102 subjects the imaged signal output from the imaging unit 101 to a predetermined signal process, and outputs the image signal (image data) subjected to the signal process to the system control unit 120 as baseband digital video data. That is to say, the imaged signal processing unit 102 samples, of the imaged signal output from the imaging unit 101, only signals having image information, by using a CDS (Correlated Double Sampling) circuit, and also performs removal of noise. Subsequently, the imaged signal processing unit 102 adjusts the gain by using an AGC (Auto Gain Control) circuit, and converts into a digital signal by using an A/D (Analog/Digital) conversion circuit. Further, the imaged signal processing unit 102 subjects the digital signal after conversion to a signal process of a detection system to extract the components of each color of R (Red), G (Green), and B (Blue), and executes a process such as gamma correction, white balance correction, or the like. Consequently, the imaged signal processing unit 102 outputs this to the system control unit 120 a single increment of baseband digital video data.

Also, the imaged signal processing unit 102 generates a video signal used for displaying an imaged image (so-called through image) on a display unit (not shown), based on the imaged signal output from the imaging unit 101. For example, a display element such as an LCD (Liquid Crystal Display) or the like can be used as this display unit.

The microphone 103 is used for collecting surrounding audio of the information recording apparatus 100, and converting this into an electric signal, and outputs this electric signal to the audio signal processing unit 104 as an audio signal.

The audio signal processing unit 104 subjects the audio signal output from the microphone 103 to a predetermined signal process, and outputs the audio signal (audio data) subjected to this signal process to the system control unit 120 as the digital audio data of a baseband. That is to say, the audio signal processing unit 104 subjects the audio signal output from the microphone 103 to a limiter process, and A/D conversion, thereby generating digital audio data. Subsequently, the audio signal processing unit 104 subjects the generated digital audio data to an audio signal process such as removal of noise, tone correction, or the like, and consequently, outputs this as a single increment of digital audio data.

The GPS signal processing unit 105 calculates position information based on the GPS signal received from a GPS signal reception antenna (not shown), and outputs the calculated position information to the system control unit 120. Note that numeric value data, such as latitude, longitude, altitude, direction, point in time, and so forth, are included in this calculated position information.

The user interface 110 is a user interface which accepts operating content input by the user, and outputs a control signal corresponding to the accepted operating content to the system control unit 120. For example, operating members, such as a moving image recording mode set/cancel button, and a recording button, are included in the information recording apparatus 100. The moving image recording mode set/cancel button is a button to be pressed at the time of setting or canceling a moving image recording mode that enables recording of a moving image. The recording button is a button to be pressed at the time of starting or ending recording of a moving image in the case of the moving image recording mode being set. Note that the user interface 110 may be configured as a touch panel, for example.

The system control unit 120 performs recording control of a moving image file or the like based on the control signal output from the user interface 110. Note that description will be made in detail regarding the system control unit 120 with reference to FIG. 2.

The recording medium 180 is a recording medium which stores information such as a moving image file or the like based on the recording control by the system control unit 120. For example, the recording medium 180 stores an AV stream (data stream) generated by the digital video data output from the imaged signal processing unit 102, and the digital audio data output from the audio signal processing unit 104 being multiplexed, as a moving image file. Also, the recording medium 180 stores a moving image management file which manages a moving image file. With an embodiment of the present invention, the position information output from the GPS signal processing unit 105 is converted into text data and bitmap data, and the text data and bitmap data are stored in the recording medium 180 by including those in a moving image file and a moving image management file. Note that the recording medium 180 may be built in the information recording apparatus 100, or may be detachable from the information recording apparatus 100. Also, various types may be used as the recording medium 180, such as semiconductor memory, an optical recording medium, a magnetic disk, a HDD (Hard Disk Drive), and so forth. Note that available optical recording media include, for example, a recordable DVD (Digital Versatile Disc), a recordable CD (Compact Disc), and a Blu-ray Disc (registered trademark).

Figure 2:
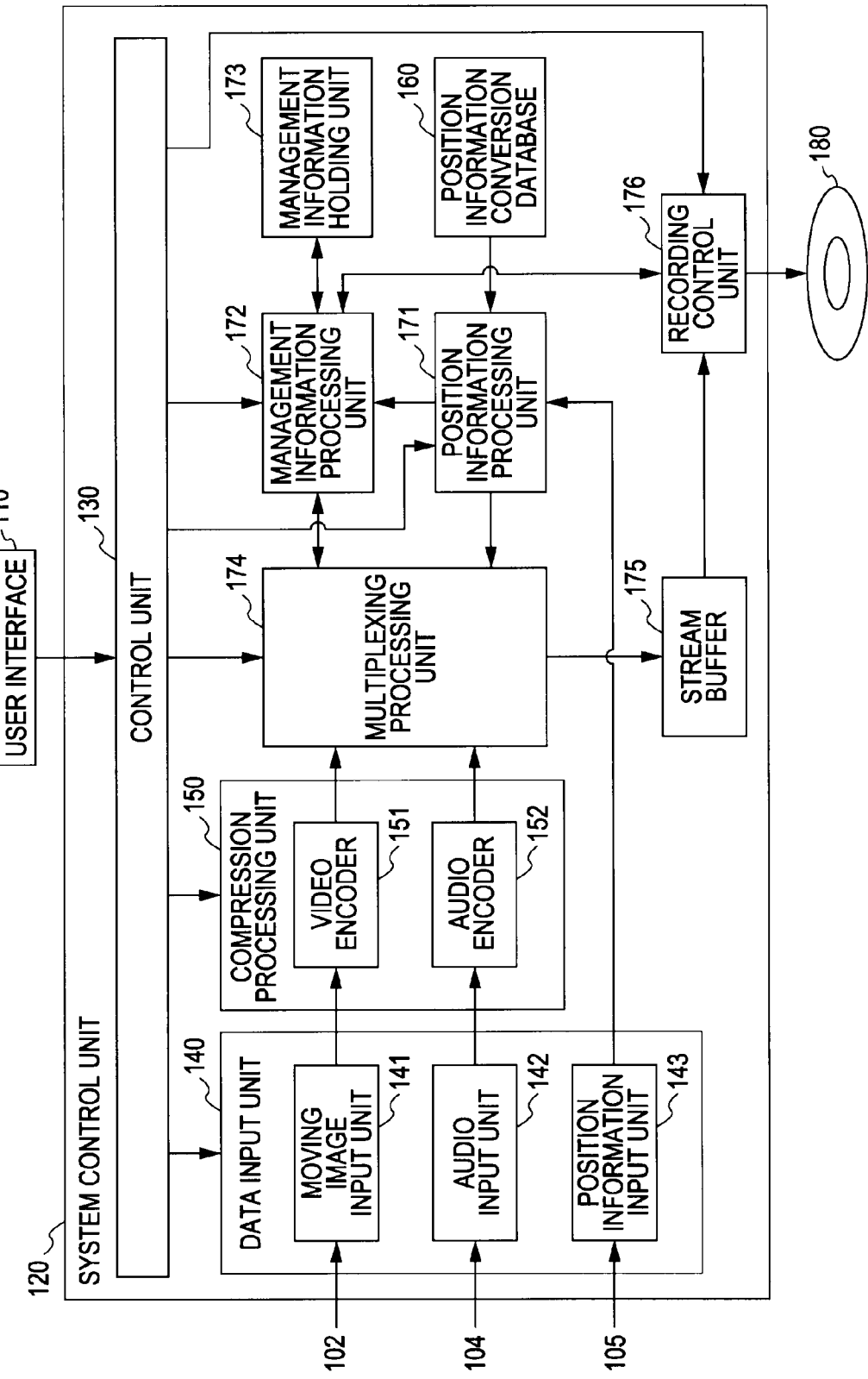
FIG. 2 is a block diagram illustrating a functional configuration example of a system control unit according to an embodiment of the present invention.

FIG. 2 is a block diagram illustrating a functional configuration example of the system control unit 120 according to an embodiment of the present invention. The system control unit 120 includes a control unit 130, a data input unit 140, a compression processing unit 150, a position information conversion database 160, a position information processing unit 171, a management information processing unit 172, and a management information holding unit 173. Also, the system control unit 120 includes a multiplexing processing unit 174, a stream buffer 175, and a recording control unit 176. The system control unit 120 compresses, encodes, and multiplexes the input digital video data and digital audio data with a predetermined moving image recording format, thereby generating an AV stream. Subsequently, the system control unit 120 records the generated AV stream in the recording medium 180. For example, a moving image recording format according to the AVCHD standard may be used as the moving image recording format.

The control unit 130 controls subordinate modules, and executes a moving image recording sequence. The control unit 130 is configured of, for example, a CPU (Central Processing Unit), RAM (Random Access Memory), ROM (Read Only Memory), and so forth. Also, the control unit 130 controls each unit of the system control unit 120 by using the RAM as work memory, based on a program and data stored in the ROM beforehand, in accordance with the control signal output from the user interface 110. For example, in a case where a pressing operation as to the moving image recording set/cancel button has been accepted by the user interface 110 in a state in which the moving image recording mode has not been set, the control unit 130 executes control to set the moving image recording mode. On the other hand, in a case where a pressing operation as to the moving image recording set/cancel button has been accepted by the user interface 110 in a state in which the moving image recording mode has been set, the control unit 130 executes control to cancel the moving image recording mode. Also, for example, in a case where a pressing operation as to the recording button has been accepted by the user interface 110 in a state in which the moving image recording mode has been set, the control unit 130 executes control to start recording of a moving image. On the other hand, in a case where a pressing operation as to the recording button has been accepted by the user interface 110 in a state in which recording of a moving image is being executed, the control unit 130 executes control to end recording of the moving image.

The data input unit 140 includes a moving image input unit 141, an audio input unit 142, and a position information input unit 143. The moving image input unit 141 inputs the digital video data of a baseband output from the imaged signal processing unit 102, and supplies this digital video data to a later-described video encoder 151. Note that the moving image input unit 141 is an example of the moving image input unit that realizes a feature of the present invention. The audio input unit 142 inputs the digital audio data of the baseband output from the audio signal processing unit 104, and supplies this digital audio data to a later-described audio encoder 152. The position information input unit 143 inputs the position information output from the GPS signal processing unit 105, and supplies this position information to the position information processing unit 171. Note that the position information input unit 143 is an example of the position information obtaining unit that realizes a feature of the present invention.

The compression processing unit 150 includes a video encoder 151, and an audio encoder 152. The video encoder 151 compresses and encodes the digital video data supplied from the moving image input unit 141 by using a predetermined compression encoding system, and supplies the compressed and encoded digital video data to the multiplexing processing unit 174 as an AV stream. In a case where the moving image recording format according to the AVCHD standard is used as the moving image recording format, the H.264/MPEG-4 AVC system capable of efficient encoding is used as the moving image compression encoding system. In the case of using this system, for example, intra-frame compression is executed with DCT (Discrete Cosine Transform) and intra-screen prediction. Subsequently, intra-frame compression is executed by using a motion vector, and further, entropy coding is executed, thereby improving compression efficiency. The audio encoder 152 compresses and encodes the digital audio data supplied from the audio input unit 142 by using a predetermined compression encoding system, and supplies the compressed and encoded digital audio data to the multiplexing processing unit 174 as an audio stream. In the case of using the moving image recording format according to the AVCHD standard as the moving image recording format, the AC3 (Audio Code number 3) system can be used as the moving image compression encoding system. Note that the digital audio data may be supplied to the multiplexing processing unit 174 in a state of baseband data without compression encoding.

The position information conversion database 160 is a database which stores conversion information used for converting the position information calculated by the GPS signal processing unit 105 into text data or bitmap data relating to the place determined with this position information. This position information conversion database 160 will be described in detail with reference to FIG. 3.

The position information processing unit 171 uses the conversion information stored in the position information conversion database 160 to convert the position information supplied from the position information input unit 143 into text data and bitmap data. Subsequently, the position information processing unit 171 outputs the position information supplied from the position information input unit 143, and the text data and bitmap data converted from this position information to the multiplexing processing unit 174 as a data stream in accordance with a predetermined moving image recording format. Also, the position information processing unit 171 outputs the position information supplied from the position information input unit 143, and the text data and bitmap data converted from this position information to the management information processing unit 172. Note that the position information processing unit 171 is an example of the position information converting unit that realizes a feature of the present invention.

The management information processing unit 172 generates moving image management information used for managing a moving image file to be recorded in the recording medium 180, and outputs the generated moving image management information to the recording control unit 176. Also, the management information processing unit 172 includes the text data and bitmap data output from the position information processing unit 171 in the moving image management information. For example, the management information processing unit 172 obtains time information from the multiplexing processing unit 174, also obtains address information of the recording medium 180 from the recording control unit 176, and generates moving image management information based on the obtained time information and address information. Subsequently, the management information processing unit 172 controls the management information holding unit 173 to hold the generated moving image management information, outputs this to the recording control unit 176 at predetermined timing, and controls the recording control unit 176 to record this in the recording medium 180 as a moving image management file. This moving image management file is configured of an index file, a movie object file, a playlist file, and a clip information file, in the case of using the moving image recording format according to the AVCHD standard as the moving image recording format. In this case, the text data output from the position information processing unit 171 is recorded in, for example, the playlist file and the clip information file. Also, the management information processing unit 172 generates information used for embedding the text data and bitmap data output from the position information processing unit 171 in the AV stream multiplexed by the multiplexing processing unit 174, and outputs this information to the multiplexing processing unit 174. Note that the management information processing unit 172 is an example of the moving image management information generating unit that realizes a feature of the present invention.

The management information holding unit 173 temporarily holds the moving image management information generated by the management information processing unit 172, and supplies the held moving image management information to the management information processing unit 172. That is to say, the management information holding unit 173 is used as the work memory of the management information processing unit 172.

The multiplexing processing unit 174 multiplexes the video stream output from the video encoder 151, and the audio stream output from the audio encoder 152 by using a predetermined method to output this as one AV stream. Also, the multiplexing processing unit 174 multiplexes the video stream and audio stream thereof, and the AV stream output from the position information processing unit 171 by using a predetermined method to output this as one AV stream. Also, the multiplexing processing unit 174 includes the text data and the bitmap data in the AV stream based on the information output from the management information processing unit 172. Subsequently, the multiplexed AV stream is output to the stream buffer 175 sequentially. For example, in the case of using the moving image recording format according to the AVCHD standard as the moving image recording format, multiplexing is executed in accordance with the MPEG-2 TS (Transport Stream). Note that the multiplexing processing unit 174 is an example of the data stream generating unit that realizes a feature of the present invention.

The stream buffer 175 is a buffer which temporarily stores the AV stream output from the multiplexing processing unit 174. The stored AV streams are recorded in the recording medium 180 based on the control of the recording control unit 176.

The recording control unit 176 monitors the data amount stored in the stream buffer 175, and upon data of a predetermined amount or more being stored in the stream buffer 175, reads out a recording increment worth of data from the recording medium 180 and writes this in the recording medium 180. That is to say, the recording control unit 176 creates a moving image file from the AV streams stored in the stream buffer 175, and records this in the recording medium 180. Also, the recording control unit 176 records the moving image management information output from the management information processing unit 172 in the recording medium 180 as a moving image management file. Note that the recording control unit 176 is an example of the recording control unit that realizes a feature of the present invention.

For example, in the case of the pressing operation of the recording button being accepted by the user interface 110 in a state in which the moving image recording mode has been set, recording operation as to the recording medium 180 is started based on the control of the control unit 130. That is to say, the digital video data output from the imaged signal processing unit 102 is compressed and encoded by the video encoder 151 based on the control of the control unit 130. Also, the digital audio data output from the audio signal processing unit 104 is compressed and encoded by the audio encoder 152. Subsequently, the compressed and encoded video data and audio data are packetized and multiplexed by the multiplexing processing unit 174 by using a predetermined format to generate an AV stream. Subsequently, the generated AV stream is supplied to the recording control unit 176 via the stream buffer 175, and is recorded in the recording medium 180 as a moving image file. On the other hand, in the case of the pressing operation of the recording button (repressing operation) being accepted by the user interface 110 in a state in which recording of a moving image is being executed, recording operation as to the recording medium 180 is stopped based on the control of the control unit 130. That is to say, recording operation of the moving image file as to the recording medium 180 is stopped, and also creation and updating of the moving image management file is executed.

FIG. 3 is a diagram schematically illustrating the content stored in the position information conversion database 160 according to an embodiment of the present invention. The position information conversion database 160 is a database which stores conversion information used for converting position information into text data and bitmap data. Specifically, position information (GPS information) 162, a place name (text data) 163, and a place name (bitmap data) 164 are stored in the position information conversion database 160 in a manner correlated with a management number 161.

The management number 161 is an identification number used for managing each place name. For example, "Long Island" is stored in a manner correlated with management number "1", and "Brooklyn" is stored in a manner correlated with management number "2".

Data used for identifying the area corresponding to a place name stored in the place names 163 and 164 is stored in the position information 162. Now, with the example shown in FIG. 3, description will be made assuming a case where the area corresponding to a place name stored in the place names 163 and 164 is identified by a polygonal area (a closed area surrounded with a polygonal line) made up of multiple points (latitude and longitude) being connected. For example, let us say that the area corresponding to a place name "Long Island" stored in the place names 163 and 164 (an area corresponding to the actual Long Island, N.Y.), and a polygonal area made up of multiple points (latitude and longitude) stored in the position information 162 of the management number "1" are approximately the same. That is to say, the data stored in the position information 162 is, for example, data indicating the latitude and longitude corresponding to the apex of the polygon corresponding to the area thereof. Note that, with the example shown in FIG. 3, specific numeric values stored in the position information 162 are omitted.

The text data of a place name to be recorded in an AV stream and a moving image management file is stored in the place name 163. Also, the bitmap data of a place name to be recorded in an AV stream and a moving image management file is stored in the place name 164. For example, a place name such as "Long Island", "Brooklyn", or the like can be used as a place name to be stored in the place names 163 and 164. For example, place names corresponding to the current administrative districts can be used as such place names. For example, increments of nations, states, and counties are taken as administrative district increments. Note that, of the position information conversion database 160 shown in FIG. 3, with regard to the area of the place name 163, characters corresponding to text data to be stored in this area are indicated with ordinary heaviness. Also, with regard to the area of the place name 164, characters corresponding to bitmap data to be stored in this area are indicated with bold font.

The example shown in FIG. 3 illustrates an example wherein a place name of district increments corresponds to the area determined with the data stored in the position information 162, but for example, multiple place names may correspond to the same area. For example, the text data and bitmap data of "Long Island" and "New York" can be stored in the place names 163 and 164 in a manner correlated with the management number "1" shown in FIG. 3. Also, another text data or bitmap data relating to the area determined with the data stored in the position information 162 may be stored. As another bitmap data relating to the area thereof, a symbol mark relating to the place corresponding to the area thereof may be used. For example, a national flag, a seal of a state, or the like may be used as this symbol mark. Also, for example, something characteristic that represents the place corresponding to the area thereof can be used as a symbol mark. For example, in the case of New York, a figure that represents the statue of liberty can be used as a symbol mark. Also, for example, numeric value information that represents the latitude and longitude and so forth corresponding to the position information calculated by the GPS signal processing unit 105 can be used as another text data or bitmap data relating to the area determined with the data stored in the position information 162. For example, text such as dd° mm' N, dd° mm' E can be used as numeric value information that represents latitude, longitude, and so forth. Note that a numeric value included in the position information calculated by the GPS signal processing unit 105 is substituted into the "dd° mm'". Also, for example, characters such as "E", "W", "S", or "N" determined from a direction included in the position information calculated by the GPS signal processing unit 105 may be used as another text data or bitmap data relating to the area determined with the position information. Further, for example, bitmap data that indicates a map including the place determined with the position information calculated by the GPS signal processing unit 105 may be used as another bitmap data relating to the area determined with the position information. Alternatively, bitmap data may be used wherein on a map including the place determined with the position information thereof, an indicator that indicates the place thereof is drawn. As the indicator indicating the place thereof, for example, an icon including at least one image or character information can be used. With the inside of the icon thereof, various types of information that indicate the place thereof may be included. Also, the example shown in FIG. 3 illustrates a case where the text data and bitmap data stored in the place names 163 and 164 indicate the same characters, but the text data and bitmap data may differ. For example, an arrangement may be made wherein text data indicating a place name is stored in the place name 163, and bitmap data that represents the symbol mark corresponding to the place name thereof is stored in the place name 164.

The position information processing unit 171 determines whether or not the latitude and longitude included in the position information calculated by the GPS signal processing unit 105 are included in the area determined with latitude and longitude stored in the position information 162. Subsequently, the position information processing unit 171 obtains the text data and bitmap data stored in the place names 163 and 164 in a manner correlated with the determined area thereof. Also, for example, an arrangement may be made wherein the position information processing unit 171 converts the latitude and longitude included in the position information calculated by the GPS signal processing unit 105 into the text data or bitmap data of numeric values that represent latitude, longitude, and so forth. Further, for example, an arrangement may be made wherein the position information processing unit 171 converts the position information calculated by the GPS signal processing unit 105 into bitmap data that indicates a map including the place determined with the position information thereof, and uses this. Alternatively, an arrangement may be made wherein the position information processing unit 171 converts the position information calculated by the GPS signal processing unit 105 into bitmap data where an indicator that indicates the place thereof is drawn on a map including the place determined with the position information thereof.

Next, description will be made in detail regarding a recording method wherein the text data and bitmap data converted based on the position information calculated by the GPS signal processing unit 105 are recorded in an AV stream in real time, with reference to the drawing.

Figure 4:
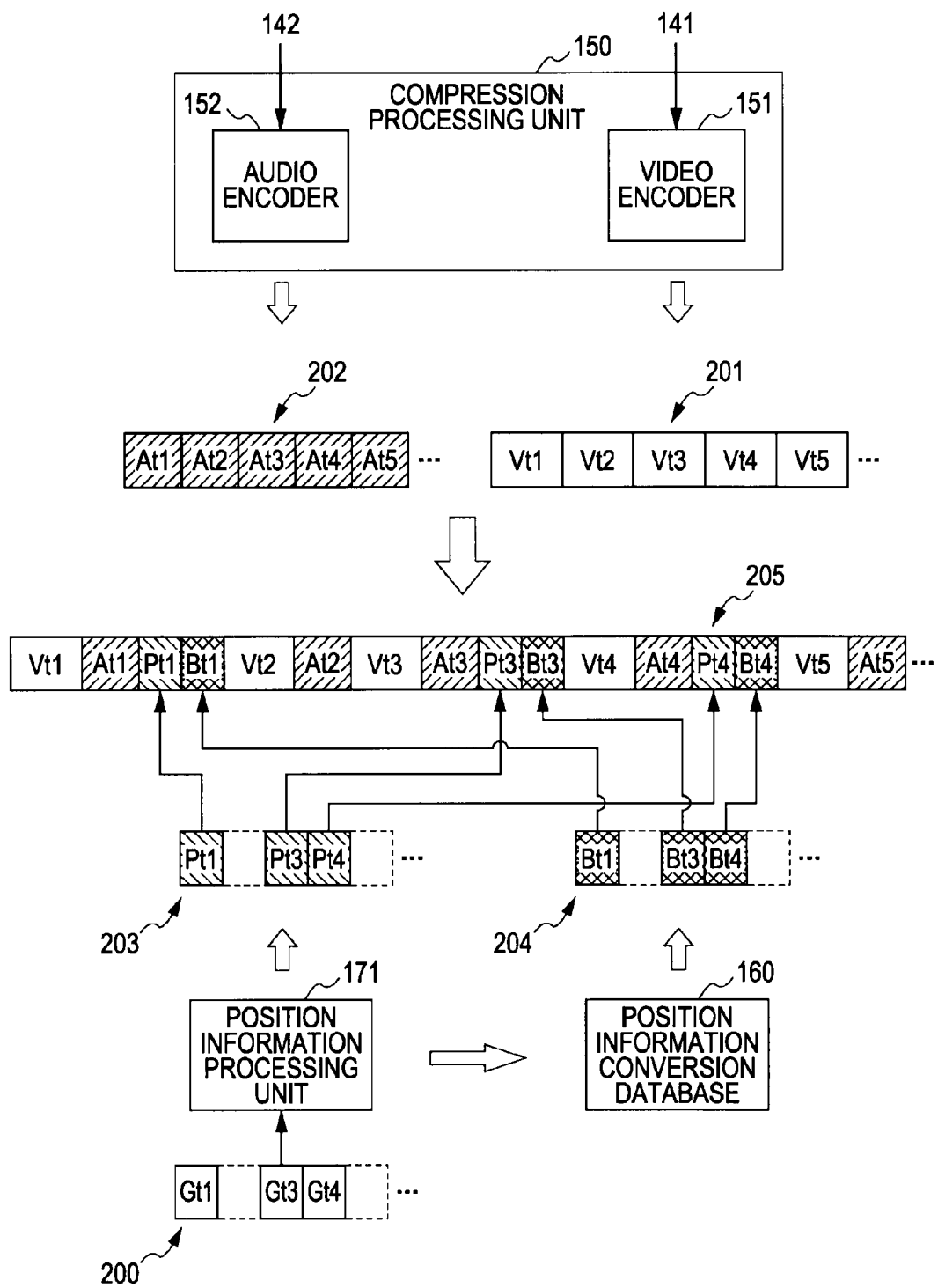
FIG. 4 is a diagram schematically illustrating a case where a multiplexing processing unit according to an embodiment of the present invention generates an AV stream.

FIG. 4 is a diagram schematically illustrates a case where the multiplexing processing unit 174 according to an embodiment of the present invention generates an AV stream. With this example, description will be made regarding a case where a video stream, an audio stream, a private stream, and a bitmap stream are multiplexed to generate an AV stream.

A video stream 201 is a stream corresponding to the digital video data compressed and encoded by the video encoder 151. Also, an audio stream 202 is a stream corresponding to the digital audio data compressed and encoded by the audio encoder 152.

A private stream 203 is a stream corresponding to position information 200 calculated by the GPS signal processing unit 105. Also, a bitmap stream 204 is a stream corresponding to the bitmap data converted by the position information processing unit 171 by using the position information conversion database 160.

These streams 201 through 204 are streams made up of concatenation of packets. The multiplexing processing unit 174 executes a multiplexing process based on point-in-time information included in each packet to generate an AV stream 205. Note that, in FIG. 4, point-in-time information included in the packets corresponding to the video stream 201 is represented with "Vtn (where n is an integer equal to or greater than 1)", and point-in-time information included in the packets corresponding to the audio stream 202 is represented with "Atn (where n is an integer equal to or greater than 1)". Also, point-in-time information included in the packets corresponding to the private stream 203 is represented with "Ptn (where n is an integer equal to or greater than 1)", and point-in-time information included in the packets corresponding to the bitmap stream 204 is represented with "Btn (where n is an integer equal to or greater than 1)". Note that the point-in-time information shown in this example is information that indicates point in time within the information recording apparatus 100. Also, let us say that packets having point-in-time information to which the same n is added are generated at the same point in time.

The multiplexing processing unit 174 periodically obtains the data stream corresponding to the position information, text data, and bitmap data output from the position information processing unit 171. Subsequently, the multiplexing processing unit 174 executes multiplexing of packets including the position information, text data, and bitmap data at optional timing. Now, an example in the case of multiplexing packets including the position information, text data, and bitmap data will be shown. For example, of the position information, text data, and bitmap data, at point in time of multiplexing the position information, text data, or bitmap data having a point in time close to the point in time of the immediately previous packet is embedded in a packet and multiplexed. The AV stream thus multiplexed is stored in the stream buffer 175 sequentially.

Note that, in the case of using the moving image recording format according to the AVCHD standard, the bitmap stream 204 corresponding to the bitmap data output from the position information processing unit 171 is multiplexed to generate a video stream 201. Also, the position information and text data output from the position information processing unit 171 are recorded in the video stream 201. Description will be made in detail regarding these examples with reference to FIGS. 5 through 21, and others.

Next, description will be made in detail regarding the AVCHD standard that is an example of the moving image recording format with reference to the drawings.

FIG. 5 is a diagram schematically illustrating the correspondence relationship between the classification of an AVCHD file and the role thereof. Note that the details of these files will be described in detail with reference to FIGS. 6 through 21, and others.

Figure 6:
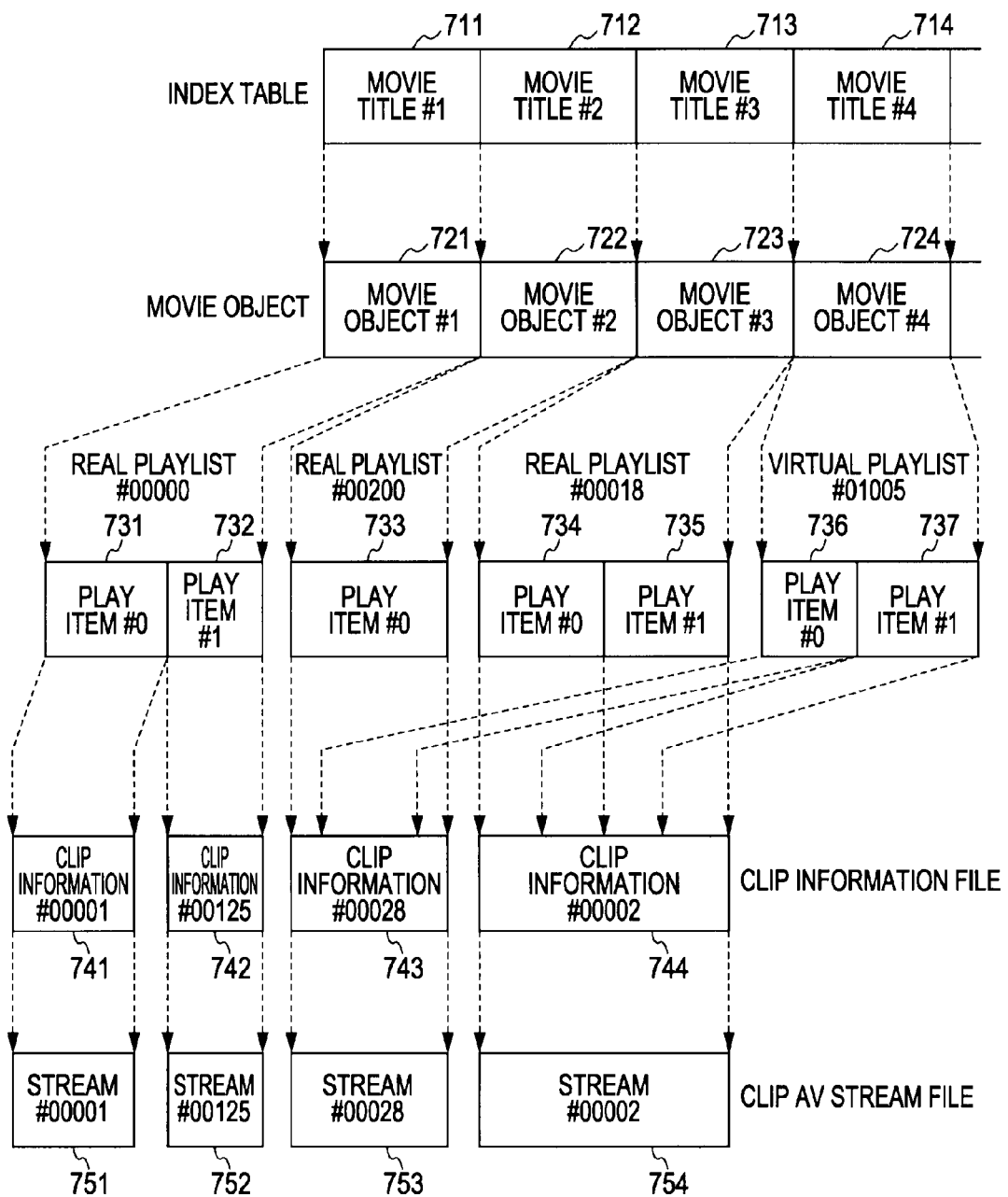
FIG. 6 is a diagram illustrating a data structure according to the AVCHD standard.

FIG. 6 is a diagram illustrating the data structure according to the AVCHD standard. With the AVCHD standard, AV data (video audio data) is handled with a hierarchical structure, which is roughly classified into an index table, movie objects, playlists, clip information files, and clip AV stream files.

The clip AV stream files are bit streams wherein video data and audio data are multiplexed with the MPEG-2 TS (Transport Stream) format. Also, a clip AV stream can be multiplexed with an overlay bitmap stream (OB stream) and a menu bitmap stream (MB stream). Here, the OB stream is a graphics stream used for displaying a caption, and the MB stream is a stream converted from data used for menu display (button image data or the like) or the like.

The clip information files are files which hold information relating to a clip AV stream file as clip information. A mapping (conversion) table between the temporal position and spatial position (address) of a clip AV stream file, and so forth are included in a clip information file. Thus, this mapping table is referenced when an access point of a clip AV stream file is specified temporally, whereby a suitable address on the clip AV stream file can be accessed.

A clip AV stream file, and a clip information file in which the corresponding clip information is recorded, will be referred to as a clip collectively. A clip AV stream file and a clip information file which make up a clip correspond to each other one on one. That is to say, with the example in this drawing, clip information 741 holds information relating to a stream 751, and clip information 742 holds information relating to a stream 752. Also, clip information 743 holds information relating to a stream 753, and clip information 744 holds information relating to a stream 754.

The playlists are configured of a clip to be played, information relating to a pair of the start point and end point of the clip thereof, and so forth. The information such as the playback start point and playback end point and so forth will be referred as a play item (PlayItem). One or more play items are included in one playlist. Playback of a clip is performed via this playlist. That is to say, a playlist is played, whereby the play items included in the playlist thereof are played sequentially. Thus, in accordance with the playback start point and playback end point within a play item, the corresponding section within the clip is played.

Playlist marks can be added to each play item. According to the playlist marks, each play item is divided into multiple chapters. Also, conversely, there is also a case where there are multiple play items within one chapter.

The playlists are roughly classified into real playlists (Real PlayList) and virtual playlists (Virtual PlayList). The real playlists are playlists that hold one or more clips basically in recording order with a clip as increments. There is neither temporal gap nor overlapping with another real playlist within this real playlist. On the other hand, the virtual playlists are playlists that arbitrarily hold a part or all of the clips corresponding to one of the real playlists. With the example in this drawing, play items 731, 732, 733, 734, and 735 belong to the real playlists, and play items 736 and 737 belong to the virtual playlists.

The movie objects are objects including a navigation command program or the like. Here, the navigation command program is a command group used for controlling playback of a playlist and a process after playback. With the example in this drawing, a movie object #1 (721) plays a real playlist #00000, and a movie object #2 (722) plays a real playlist #00200. Also, a movie object #3 (723) plays a real playlist #00018, and a movie object #4 (724) plays a virtual playlist #01005.

The index table is the highest level table that defines the title of a content recorded in the recording medium. One or more movie titles are included in this index table, and the corresponding movie object is arranged to be specified from each movie title. With the example in this drawing, a movie title #1 (711) specifies the movie object #1 (721), and a movie title #2 (712) specifies the movie object #2 (722). Also, a movie title #3 (713) specifies the movie object #3 (723), and a movie title #4 (714) specifies the movie object #4 (724). With a playback apparatus, playback of a content is controlled based on title information stored this index table.

Figure 7:
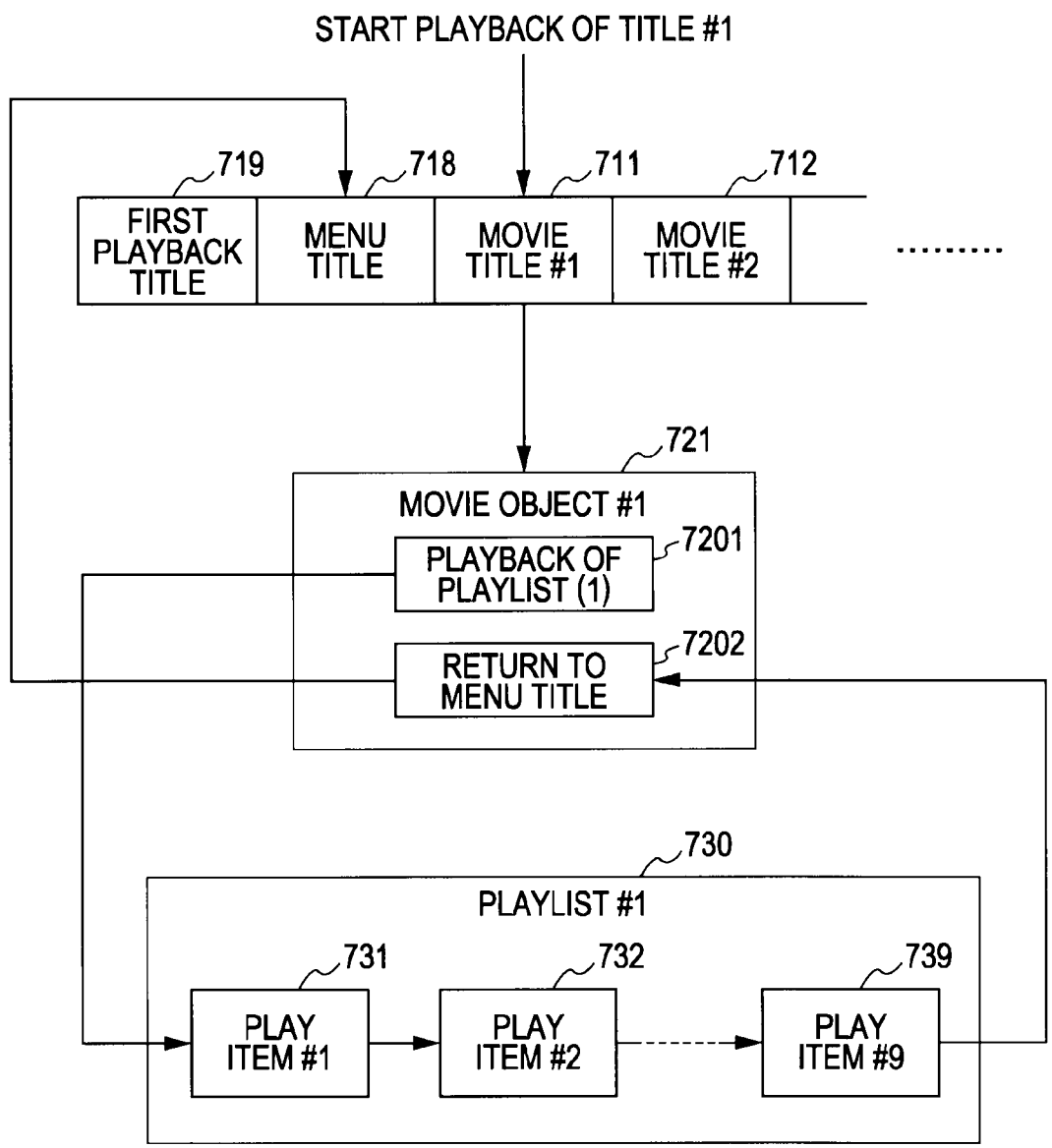
FIG. 7 is a diagram illustrating a surrounding related example of a movie object according to the AVCHD standard.

FIG. 7 is a diagram illustrating a surrounding related example of a movie object according to the AVCHD standard. In addition to the above-mentioned movie titles, a first playback title 719, and a menu title 718 are included in the index table. The first playback title 719 specifies the movie object corresponding to the title to be played first. The menu title 718 specifies the movie object corresponding to a menu screen.

Now, let us assume a case where the playback start of the title #1 has been specified. The movie object #1 (721) is specified from the movie title #1 (711), whereby the navigation command program included in the movie object #1 (721) is executed.

Upon a command (7201) used for instructing playback of a playlist #1 (730) being executed with the movie object #1 (721), the play items of the playlist #1 (730) are sequentially played. The corresponding clip is played via the playlist #1 (730). With the example in this drawing, a play item #1 (731), and a play item #2 (732) are played in this order, and upon playback of a play item #9 (739) being completed, control is returned to the movie object #1 (721).

With the movie object #1 (721), the navigation program command to the effect that control is returned to the menu title (7202), and control proceeds to the menu title 718.

Figure 8:
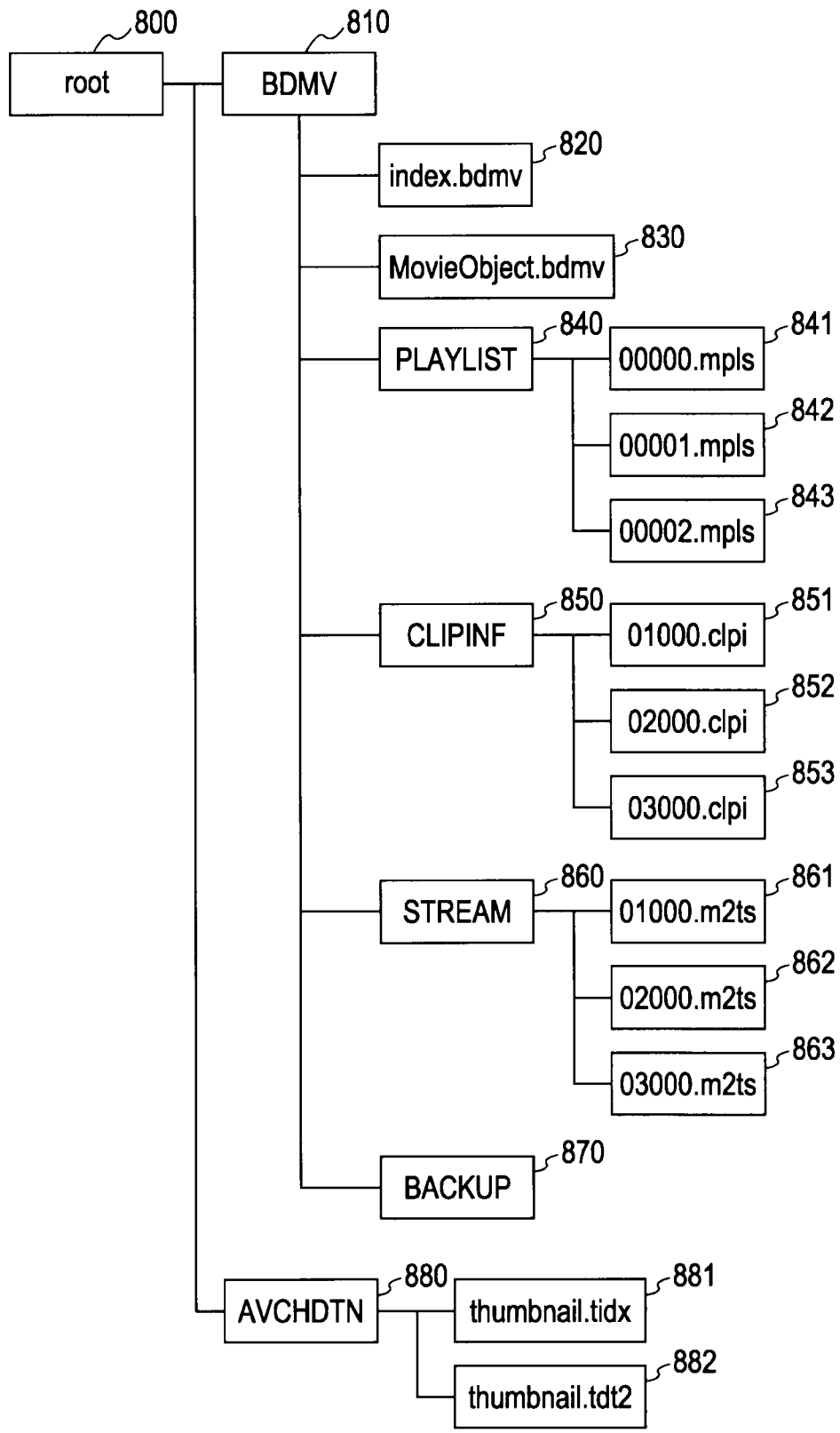
FIG. 8 is a diagram illustrating an example of a file configuration according to the AVCHD standard.

FIG. 8 is a diagram illustrating an example of a file configuration according to the AVCHD standard. A directory "BDMV" 810 including the content of a clip is disposed below the root directory of the recording medium. Also, a directory "AVCHDTN" 880 including a thumbnail is disposed under the root directory as appropriate.

A file "index.bdmv" 820 and a file "MovieObject.bdmv" 830 are disposed immediately under the directory "BDMV" 810. Also, a directory "PLAYLIST" 840, a directory "CLIPINF" 850, a directory "STREAM" 860, and a directory "BACKUP" 870 are disposed under the directory "BDMV" 810.

The file "index.bdmv" 820 stores the content of the directory "BDMV" 810, and corresponds to the index table described in FIG. 6. Also, the file "MovieObject.bdmv" 830 stores the information of a movie object, and corresponds to the movie object described in FIG. 6.

The directory "PLAYLIST" 840 is a directory where a database for playlists is disposed. The directory "PLAYL- IST" 840 includes, for example, files 841 through 843 which are files relating to playlists. The file name of a file belonging to the directory "PLAYLIST" 840 is made up of five digits and an extension. Of the five digits, 1000 numbers of "00000" through "00999" are for real playlists, and 200 numbers of "01000" through "01199" are for virtual playlists. Also, ".mpls" is used as the extension of each file.

The directory "CLIPINF" 850 is a directory where a database for clips is disposed. The directory "CLIPINF" 850 includes, for example, files 851 through 853 which are clip information files corresponding to clip AV stream files, respectively. The file name of a file belonging to the directory "CLIPINF" 850 is made up of five digits and an extension. ".clpi" is used as the extension of each file.

The directory "STREAM" 860 is a directory where an AV stream file serving as an entity is disposed. The directory "STREAM" 860 includes, for example, clip AV stream files 861 through 863 corresponding to clip information files, respectively. A file belonging to the directory "STREAM" 860 is made up a transport stream according to the MPEG-2, and the file name thereof is made up of five digits and an extension. The 5-digit portion of the file name is set to the same as that of the corresponding clip information file, thereby showing the correspondence relationship between the clip information file and this clip AV stream file. Also, ".m2ts" is used as the extension of each file.

The directory "BACKUP" 870 is used for storing the backup of the above-mentioned directories and files.

Two types of thumbnail files "thumbnail.tidx" 881 and "thumbnail.tdt2" 882 can be disposed in the directory "AVCHDTN" 880. The thumbnail file "thumbnail.tidx" 881 is a file which stores index information as to each thumbnail image data, and the thumbnail file "thumbnail.tdt2" 882 is a thumbnail image data assembly.

Next, description will be made in detail regarding a case where the text data and bitmap data converted by using the position information conversion database 160 are recorded in an AV stream according to the AVCHD standard, with reference to the drawings. First, description will be made regarding a case where the text data is recorded in an AV stream according to the AVCHD standard.

FIG. 9 is a diagram showing the whole data structure of a modified digital video pack (MDP) according to the AVCHD standard. The syntax thereof will be shown here based on the description method of the C language that is used as a program description language.

This MDP is stored in an elementary stream (ES) of video data as user data. With this user data, a field "uuid_iso_iec_11578" has a data length of 128 bits. The identifier of this user data will be shown with a universally unique identifier (UUID) stipulated by the "ISO/IEC 11578".

A field "TypeIndicator" has a data length of 32 bits, and indicates the data type of this user data. In the event that this data type is "0x4741 3934 (0x means that the subsequent numbers are hexadecimal numbers; this is true for the following expressions)", this user data is closed caption (CC) caption data (cc_data). Also, in the event that this data type is "0x4D44 504D", this user data is MDP meta data (Modified-DVPackMeta).

MDPs of a 40-bit length (one_modified_dv_pack) equivalent to an arbitrary number of entries are included in the MDP meta data. This number of entries is stored in a field "number_of_modified_dv_pack_emtries" of an 8-bit length. A field "mdp_id" of an 8-bit length that indicates the ID of an MDP, and a field "mdp_data" of a 32-bit length that indicates MDP data are included in one MDP.

FIGS. 10 and 11 are diagrams illustrating the correspondence relationship between the ID and accompanying information of an MDP according to the AVCHD standard. As shown in the drawings, the accompanying information of an MDP includes information relating to imaged date and time, information relating to imaged conditions such as exposure time, F value, and so forth, information relating to the GPS, information relating to a camera, and so forth.

For example, as shown in FIG. 10, the IDs "0x18" and "0x19" of MDPs indicate information relating to imaged date and time. Also, as shown in FIG. 11, the IDs "0xB0" through "0xCF" of MDPs indicate information relating to the GPS. Thus, information relating to the GPS can be stored in MDPs. Also, with an embodiment of the present invention, the position information conversion database 160 is used to record the text data converted from the GPS information by the position information processing unit 171 in "MAKER OPTION (IDs "0xE1" through "0xEF" of MDPs)". Thus, even in a case where playback is executed by a playback apparatus having no conversion database used for converting the GPS information into text data such as a place name and so forth, along with a moving image to be played, text data relating to a place where this moving image has been imaged can be displayed. Also, various types of display playback can be performed by using the text data stored in the MAKER OPTION, and the information relating to the GPS in which the IDs "0xB0" through "0xCF" of MDPs. Note that, in a case where text data is recorded in an MDP, for example, recording can be executed for each frame. Also, for example, recording may be executed for each GOP (Group Of Picture), or may be executed for each certain interval within a stream.

Next, description will be made regarding a case where bitmap data is recorded in an AV stream according to the AVCHD standard. With this example, description will be made regarding a case where the bitmap data converted based on position information is recorded as an overlay bitmap according to the AVCHD standard.

FIGS. 12A and 12B are diagrams showing the data structure of a bitmap unit included in an overlay bitmap according to the AVCHD standard. FIG. 12A is the data structure of the whole bitmap unit. Also, a field "UnitDescriptor( )" thereof is, as shown in FIG. 12B, made up of a field "UnitType" of an 8-bit length, and a field "UnitLength" of a 16-bit length.

The "UnitType" is a field that represents the type of the bitmap unit, the data corresponding to this type is stored in a field "UnitData( )" of the bitmap unit. The "UnitLength" indicates the number of bytes of the bitmap unit.

FIG. 13 is a diagram illustrating the type of the bitmap unit according to the AVCHD standard. As shown in this drawing, in the event that the "UnitType" in FIG. 12B is "0x14", "Palette Unit" is stored in the "UnitData( )". This "Palette Unit" is used for storing the color of each pixel, a transparency information table, and so forth.

In the event that the "UnitType" is "0x15", "Object Unit" is stored in the "UnitData( )". This "Object Unit" is used for storing the bitmap data body, position, size information, and so forth.

In the event that the "UnitType" is "0x16", "Overlay Bitmap Compilation Unit" is stored in the "UnitData( )". This "Overlay Bitmap Compilation Unit" is used for storing the type of display information relating to an overlay bitmap, related information between an object and a window, and so forth.

In the event that the "UnitType" is "0x17", "Window Unit" is stored in the "UnitData( )". This "Window Unit" is used for storing information relating to a display section within the screen, and so forth.

In the event that the "UnitType" is "0x18", "Menu Bitmap Compilation Unit" is stored in the "UnitData( )". This "Menu Bitmap Compilation Unit" is used for storing the type of display information relating to a menu bitmap, related information between an object and a window, and so forth.

In the event that the "UnitType" is "0x80", "End Unit" is stored in the "UnitData( )". This "End Unit" is used for storing the end information of display increments.

FIGS. 14A and 14B are diagrams showing the data structure of the "ObjectUnit( )" according to the AVCHD standard. In a case where the "UnitType" indicates "0x15", this "ObjectUnit( )" is stored in the field "UnitData( )" of the bitmap unit.

As shown in FIG. 14A, the "ObjectUnit( )" stores a field "ObjectID" of a 16-bit length following a field "UnitDescriptor( )" of a 24-bit length. Subsequently, the "ObjectUnit( )" stores a field "ObjectVersionNumber" of an 8-bit length, a field "SequenceDescriptor( )", and a field "ObjectData( )".

As shown in FIG. 14B, the "ObjectData( )" stores a field "ObjectDataLength" of a 24-bit length that indicates an object data length. Subsequently, the "ObjectData( )" stores a field "ObjectWidth" of a 16-bit length that indicates an object width, and a field "ObjectHeight" of a 16-bit length that indicates an object height. Following these, the "ObjectData( )" stores a field "RunLengthEncodedLine( )" that indicates bitmap data converted into run length code.

Thus, with the AVCHD standard, bitmap data converted into run length code can be stored in the "ObjectUnit( )" of the bitmap unit included in an overlay bitmap. Therefore, with an embodiment of the present invention, the bitmap data converted by the position information processing unit 171 is converted into run length code, and the bitmap data converted into run length code is stored in the "ObjectUnit( )". Thus, even in a case where playback is executed by a playback apparatus having no conversion database used for converting the GPS information into bitmap data such as a place name and so forth, along with a moving image to be played, bitmap data relating to a place where this moving image has been imaged can be displayed.

Also, for example, let us consider a case where a moving image file in which text data has been recorded in an MDP, and bitmap data has been recorded in an overlay bitmap, is played. For example, in a case where this moving image file is played by using a digital video camera which can display not an overlay bitmap but an MDP, the text data recorded in the MDP can be displayed. Also, in a case where this moving image file is played by using a playback apparatus which can display not an MDP but an overlay bitmap, the bitmap data recorded in the overlay bitmap can be displayed. Thus, text data has been recorded in an MDP, and bitmap data has been recorded in an overlay bitmap, whereby either data can be displayed, for example, even in a case a moving image file is moved to an apparatus having a different function.

Next, description will be made in detail regarding a case where text data is recorded in file management information according to the AVCHD standard, with reference to the drawings. First, description will be made regarding a case where text data is recorded in a clip information file according to the AVCHD standard.

FIG. 15 is a diagram showing the data structure of a clip information file according to the AVCHD standard.

With this clip information file, a field "type_indicator" has a 32-bit (8 bits×4 bytes) data length, and is an identifier that indicates that the file type of this file is a clip information file. A field "version_number" has a 32-bit data length, and a fixed value is described therein.

This clip information file includes a block "ClipInfo( )", a block "SequenceInfo( )", a block "ProgramInfo( )", and a block "CPI( )". Also, this clip information file includes a block "ClipMark( )", and a block "ExtensionData( )". Each block indicates the start address of the corresponding block with the corresponding field having a 32-bit data length except for the block "ClipInfo( )". These fields are a field "SequenceInfo_start_address", a field "ProgramInfo_start_address", a field "CPI_start_address", a field "ClipMark_start_address", and a field "ExtensionData_start address".

The field "ExtensionData_start_address" indicates the start address of the block "ExtensionData( )" with a relative byte count from the top of this clip information file. The relative byte count is started from "0". If the value of this field "ExtensionData_start_address" is "0", this indicates that there is no "ExtensionData( )" within this clip information file.

The block "ClipInfo( )" is started following an area "reserved_for_future_use" having a 96-bit data length following the fields that indicate the corresponding start address. The block "ClipInfo( )" is used for describing information relating to a clip AV stream that this clip information file manages.

The block "SequenceInfo( )" is used for describing information that manages a sequence where system time base or arrival time base continues, as a block. Here, the system time base is system time clock (STC), and the arrival time base is arrival time clock (ATC).

The block "ProgramInfo( )" is used for describing information such as the encoding system of a clip AV stream managed with this clip information file, the aspect ratio of video data within a clip AV stream, and so forth.

The block "CPI( )" stores information relating to a mapping table between the temporal position and spatial position of the whole stream file. Note that significant information is not included in the block "ClipMark( )".

The block "ExtensionData( )" is an area where extension data can be stored. This block "ExtensionData( )" will be described in detail with reference to FIG. 16.

FIG. 16 is a diagram showing the data structure of a block "ClipExtensionData( )" of a clip information file according to the AVCHD standard.

With this block "ClipExtensionData( )", a field "type_indicator" has a 32-bit (8 bits×4 bytes) data length. This is an identifier that indicates that the type of this block is the extension data of a clip information file.

This block "ClipExtensionData( )" includes a block "ClipInfoExt( )", a block "ProgramInfoExt( )", and a block "MakersPrivateData( )". A field "ProgramInfoExt_start_address" and a field "MakersPrivateData_start_address" each having a 32-bit data length indicate the start address of the corresponding block. Note that the block "ClipInfoExt( )" is started following an area "reserved_for_future_use" having a 192-bit data length following the fields that indicate the corresponding start address.

The field "MakersPrivateData_start_address" indicates the start address of the block "MakersPrivateData( )" with a relative byte count from the top of this block "ClipExtensionData( )". The relative byte count is started from "0". If the value of this field "MakersPrivateData_start_address" is "0", this indicates that there is no block "MakersPrivateData( )" within this block "ClipExtensionData( )". This block "MakersPrivateData( )" is a block where a maker's original information is described regarding this clip information file. Note that description will be made in detail regarding this block "MakersPrivateData( )" with reference to FIG. 17.

FIG. 17 is a diagram showing the data structure of the block "MakersPrivateData( )" of a clip information file according to the AVCHD standard.

With this block "MakersPrivateData( )", a field "length" has a 32-bit data length, and indicates the data length from immediately after this field "length" to the end of this block "MakersPrivateData( )". In a case where the value of this field "length" is "0", this indicates that no information is described in this "MakersPrivateData( )". In a case where the value of this field "length" is a value other than "0", the description following the if sentence is made.

A field "data_block_start_address" has a 32-bit data length, and indicates the start address of a block "data_block( )" where a maker's original information body is stored, with a relative byte count from the top byte of the block "MakersPrivateData( )". Subsequently, a field "number_of_maker_entries" having an 8-bit data length is disposed via a field "reserved_for_word_align" having a 24-bit data length.

The entries of extension data equivalent to the count indicated with the field "number_of_maker_entries" are described in accordance with the next for sentence. Specifically, a field "maker_ID", a field "maker_model_code", a field "mpd_start_address", and a field "mpd_length" are described.

The field "maker_ID" and the field "maker_model_code" each have a 16-bit data length, wherein the identification information of a maker, and the identification of a model type according to this maker are described. Also, the field "mpd_start_address" and the field "mpd_length" each have a 32-bit data length, and indicate the start address by a relative byte count from the top byte of this block "MakersPrivateData( )", and the data length, of the block "data_block( )" where the body of extension data is stored.

The entries of extension data equivalent to the count indicated with the field "number_of_maker_entries" are described. Following this description, a field "padding_word" having a 16-bit data length, made up of an arbitrary data string is repeatedly described an arbitrary number of times with two fields as a set. Subsequently, the block "data_block( )" where the body of extension data is stored is described. One piece or more of extension data is stored in the block "data_block( )". That is to say, a maker's original extension data is stored in the block "data_block( )" for each maker and each model indicated with the field "maker_ID" and the field "maker_model_code". Each piece of extension data is taken out from the block "data_block( )" based on the field "mpd_start_address" and the field "mpd_length".

With an embodiment of the present invention, the text data converted by the position information processing unit 171 is stored in the block "data_block( )". Also, a position information structure is defined in the block "data_block( )", whereby the position information calculated by the GPS signal processing unit 105 can be recorded in the position information structure. The data structure examples of these will be shown in FIG. 18.

FIGS. 18A and 18B are diagrams showing a data structure example defined in the block "data_block( )" of a clip information file according to the AVCHD standard.

A data structure example in a case where the text data converted by the position information processing unit 171 is stored in the block "data_block( )" is shown in FIG. 18A. For example, text data up to a 256-byte data length can be recorded.

A data structure example in a case where the position information calculated by the GPS signal processing unit 105 is stored in the block "data_block( )" is shown in FIG. 18B. Note that the content shown in FIG. 18B may be the content corresponding to information relating to the GPS of the IDs "0xB0" through "0xC8" of the MDP shown in FIG. 11. Also, the text data shown in FIG. 18A, and the position information (GPS information) shown in FIG. 18B can be recorded in the block "data_block( )". Thus, for example, the same data as the GPS information and text data to be recorded in an MDP can be recorded in a clip information file. In this case, for example, only the first valid GPS information (representative GPS information) of the GPS information recorded in an AV stream of the corresponding chapter, and the text data corresponding thereto can be recorded in a clip information file.

Thus, text data can be recorded in a clip information file. Thus, even in a case where playback is executed by a playback apparatus having no conversion database used for converting the GPS information into text data such as a place name and so forth, along with a moving image to be played, text data relating to a place where this moving image has been imaged can be displayed. Also, even in a state before an AV stream is decoded, text data relating to a place where a moving image to be played has been imaged can be displayed. Also, position information can be recorded in a clip information file along with text data. Thus, even in a case before an AV stream is decoded, position information relating to a place where a moving image to be played has been imaged can be used.

Next, description will be made regarding a case where text data is recorded in a playlist file according to the AVCHD standard.

FIG. 19 is a diagram showing the data structure of the block "ExtensionData( )" of a playlist file according to the AVCHD standard. This block "ExtensionData( )" is an area where extension data of a playlist file can be stored.

With this block "ExtensionData( )", a field "length" has a 32-bit data length, and indicates a data length from immediately after this field "length" to the end of the block "ExtensionData( )". In a case where the value of the field "length" is "0", this indicates that no information is described in this block "ExtensionData( )". In a case where the value of the field "length" is a value other than "0", the description following the if sentence is made.

A field "data_block_start_address" has a 32-bit data length, and indicates the start address of the block "data_block( )" where extension data is stored, with a relative byte count from the top byte of the block "ExtensionData( )". A field "number_of_ext_data_entries" having an 8-bit data length is disposed via a field "reserved_for_word_align" having a 24-bit data length.

The entries of extension data equivalent to the count indicated with the field "number_of_ext_data_entries" are described in accordance with the next for sentence. Specifically, a field "ID1", a field "ID2", a field "ext_data_start_address", and a field "ext_data_length" are described.

The field "ID1" and the field "ID2" each have a 16-bit data length, where identification information is described. Also, the field "ext_data_start_address" and the field "ext_data_length" each have a 32-bit data length, and indicate the start address by a relative byte count from the top byte of the block "ExtensionData( )" where the body of the extension data is stored, and data length.

The entries of extension data equivalent to the count indicated with the field "number_of_ext_data_entries" are described. Following this description, a field "padding_word" having a 16-bit data length, made up of an arbitrary data string is repeatedly described an arbitrary number of times with two fields as a set. Subsequently, the block "data_block( )" where the body of extension data is stored is described. One piece or more of extension data is stored in the block "data_block( )". Each piece of extension data is taken out from the block "data_block( )" based on the field "ext_data_start_address" and the field "ext_data_length". This block "data_block( )" will be described in detail with reference to FIG. 20.

FIG. 20 is a diagram showing the data structure of a block "blkPlayListMarkExt( )" according to the AVCHD standard. This block "blkPlayListMarkExt( )" is the block "data_block( )" included in the block "ExtensionData( )" of the playlist file shown in FIG. 19, and stores extension data relating to chapter marks.

A field "length" that indicates a data length, and a field "NumberOfPlayListMarks" that indicates the number of chapter marks are included in this block "blkPlayListMarkExt( )". Following these, a block "blkMarkExtension" is stored for each chapter mark.

Here, text data can be recorded in "MarkName" and "MakersInformation". Therefore, with an embodiment of the present invention, the text data converted from position information by the position information processing unit 171 by using the position information conversion database 160 is stored in the "MarkName" and "MakersInformation".

The text data stored in the "MarkName" can be displayed, for example, as a chapter name. Therefore, for example, the text data of the place name converted by the position information processing unit 171 can be stored in the "MarkName". Also, for example, text data different from the "MarkName" can be stored in the "MakersInformation". For example, the position information processing unit 171 converts the latitude and longitude included in the position information calculated by the GPS signal processing unit 105 into text data that represents latitude, longitude, and so forth. This text data can be stored in the "MakersInformation". This text data that represents latitude, longitude, and so forth may be taken as characters, for example, such as "dd° mm' N, dd° mm' E".

Thus, text data can be stored in the "MarkName" and "MakersInformation". Thus, even in a case where playback is executed by a playback apparatus having no conversion database used for converting the GPS information into text data such as a place name and so forth, along with a moving image to be played, text data relating to a place where this moving image has been imaged can be displayed. Also, even in a state before an AV stream is decoded, text data relating to a place where a moving image to be played has been imaged can be displayed. Further, for example, in a case where the text data of a place name has been stored in the "MarkName", and text data that represents latitude, longitude, and so forth has been stored in the "MakersInformation", a place name, latitude, longitude, and so forth can be displayed at another playback apparatus. Also, in a case where text data and so forth are recorded in a clip information file and a movie playlist file, for example, a place name and so forth relating to a moving image can be displayed even at a playback apparatus having no decode function for AV streams. Thus, the content of a moving image can be understood quickly.

Also, in a case where position information and text data are recorded in a clip information file and a movie playlist file, different information may be recorded in each of the files. Also, with regard to a case where recording is performed as to each of an MDP, an overlay bitmap, a clip information file, and a movie playlist file as well, similarly, different information can be recorded to each of these. In this case, for example, an arrangement may be made wherein information is recorded in an MDP and an overlay bitmap for each frame, and only representative information for each chapter is recorded in a clip information file and a movie playlist file.

Thus, according to an embodiment of the present invention, position information, text data, and bitmap data may be recorded in multiple hierarchies and used.

Next, description will be made regarding the operation of the information recording apparatus 100 according to an embodiment of the present invention, with reference to the drawings.

Figure 21:
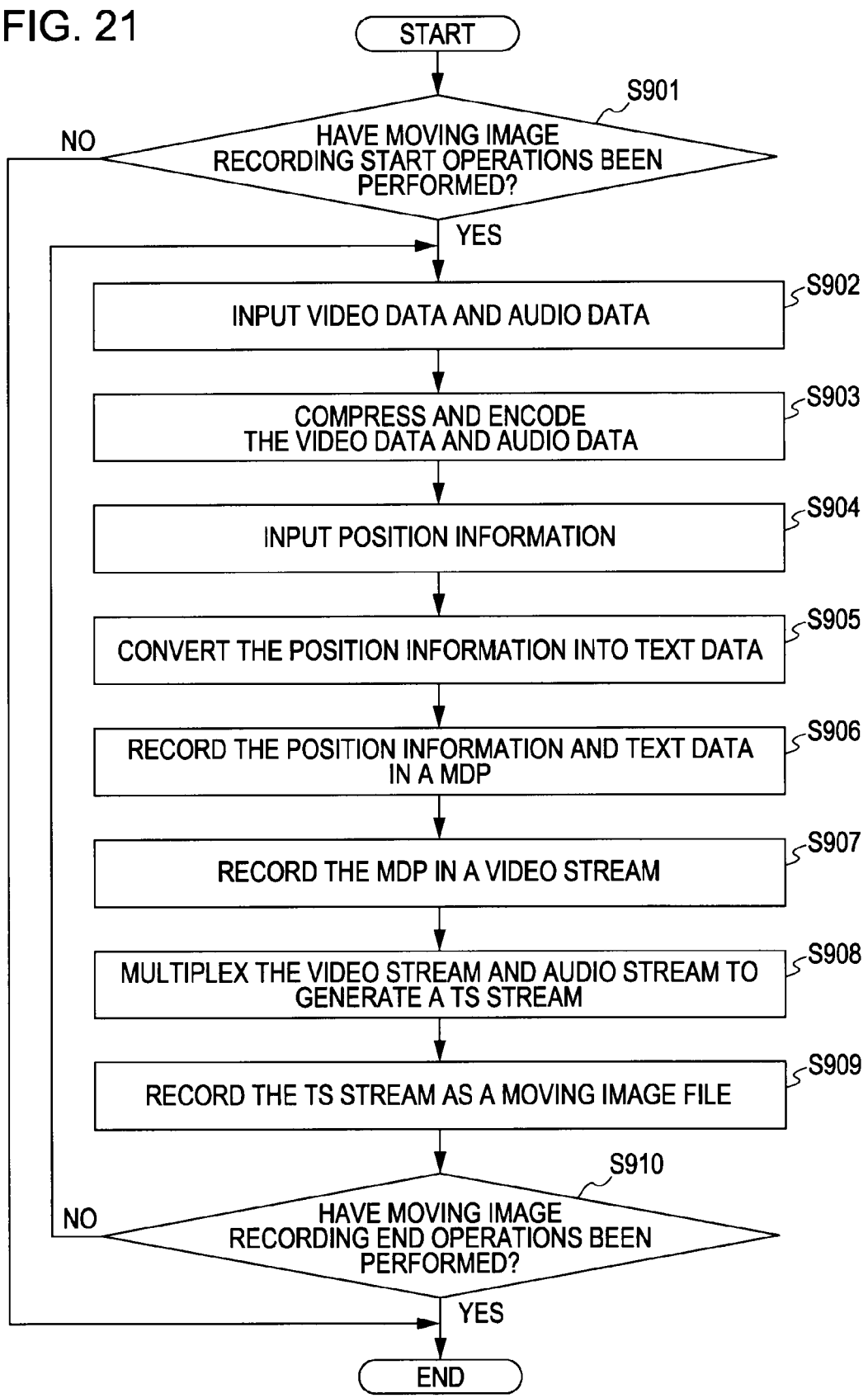
FIG. 21 is a flowchart illustrating the procedure of moving image recording process executed by the information recording apparatus 100 according to an embodiment of the present invention.

FIG. 21 is a flowchart illustrating the procedure of a moving image recording process by the information recording apparatus 100 according to an embodiment of the present invention. With this example, description will be made regarding a case where position information and text data are recorded in an MDP according to the AVCHD standard.

First, determination is made whether or not start operations for recording of a moving image have been performed (step S901). For example, in a state in which the moving image recording mode has been set, determination is made whether or not an operation for pressing the recording button has been accepted. In a case where the start operations for recording a moving image has not been performed (step S901), the operation of the moving image recording process is ended.

In a case where the start operations for recording a moving image has been performed (step S901), the digital video data output from the imaged signal processing unit 102, and the digital audio data output from the audio signal processing unit 104 are input (step S902). Note that step S902 is an example of the moving image input procedure that realizes a feature of the present invention. Subsequently, the compression processing unit 150 compresses and encodes the input digital video data and digital audio data (step S903). Subsequently, the position information output from the GPS signal processing unit 105 is input (step S904), and the position information processing unit 171 uses the conversion information stored in the position information conversion database 160 to convert the position information into text data (step S905). Note that step S904 is an example of the position information obtaining procedure that realizes a feature of the present invention. Also, step S905 is an example of the position information converting procedure that realizes a feature of the present invention.

Subsequently, the input position information and the converted text data are output from the management information processing unit 172 to the multiplexing processing unit 174, and are recorded in an MDP (step S906). Subsequently, the MDP in which the position information and text data are stored is recorded in a video stream wherein digital video data has been compressed and encoded (step S907). Subsequently, the multiplexing processing unit 174 multiplexes the video stream where the MDP has been recorded, and the audio stream compressed and encoded to generate a TS stream (step S908). Note that step S908 is an example of the data stream generating procedure that realizes a feature of the present invention. Subsequently, the generated TS stream is converted into a moving image file, and is recorded in the recording medium 180 (step S909). Note that the generated TS stream is stored in the stream buffer 175 temporarily, and upon data at or above predetermined amount being stored in the stream buffer 175, the TS stream is recorded in the recording medium 180. Also, step S909 is an example of the recording control procedure that realizes a feature of the present invention.

Subsequently, determination is made whether or not moving image recording end operations have been performed (step S910). For example, determination is made whether or not a pressing operation as to the recording button has been accepted in a state in which recording of a moving image is being performed. Subsequently, in a case where moving image recording end operations have not been performed (step S910) the process returns to step S902. On the other hand, in a case where moving image recording end operations have been performed (step S910), the operation of the moving image recording process is ended.

Figure 22:
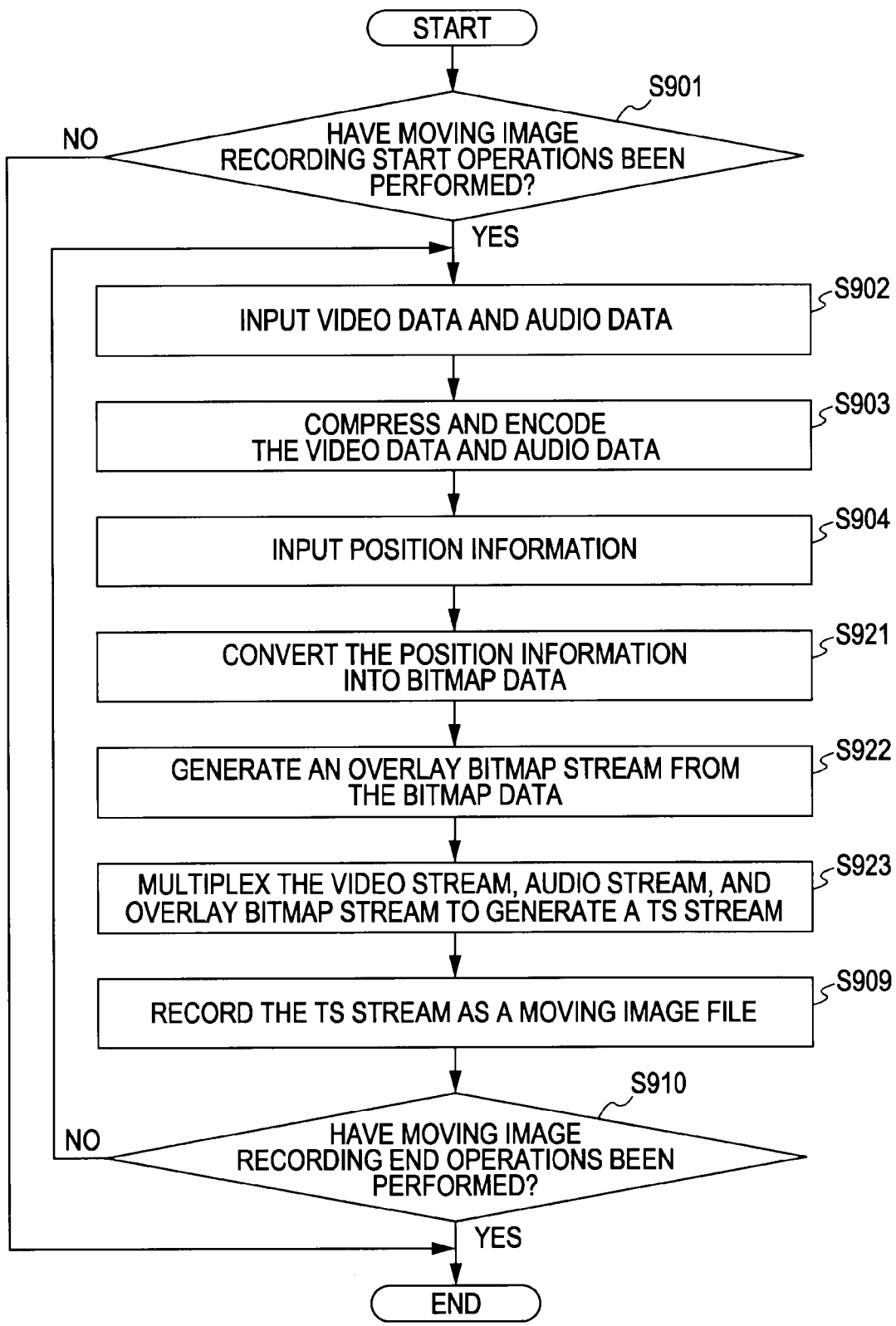
FIG. 22 is a flowchart illustrating the procedure of moving image recording process executed by the information recording apparatus according to an embodiment of the present invention.

FIG. 22 is a flowchart illustrating the procedure of the moving image recording process by the information recording apparatus 100 according to an embodiment of the present invention. With this example, description will be made regarding an example wherein bitmap data is recorded as an overlay bitmap stream according to the AVCHD standard. Note that this procedure is a modification of the procedure shown in FIG. 21. Therefore, steps S901 through S904, S909, and S910 shown in FIG. 22 are the same procedures as steps S901 through S904, S909, and S910 shown in FIG. 21, and accordingly, description thereof will be omitted here.

The position information output from the GPS signal processing unit 105 is input (step S904), and the position information processing unit 171 uses the conversion information stored in the position information conversion database 160 to convert the position information into bitmap data (step S921). Also, step S921 is an example of the position information converting procedure that realizes a feature of the present invention. Subsequently, the position information processing unit 171 generates an overlay bitmap stream corresponding to the converted bitmap data (step S922). Subsequently, the multiplexing processing unit 174 multiplexes the video stream and audio stream compressed and encoded, and the generated overlay bitmap stream to generate a TS stream (step S923). Note that step S923 is an example of the data stream generating procedure that realizes a feature of the present invention.

Figure 23:
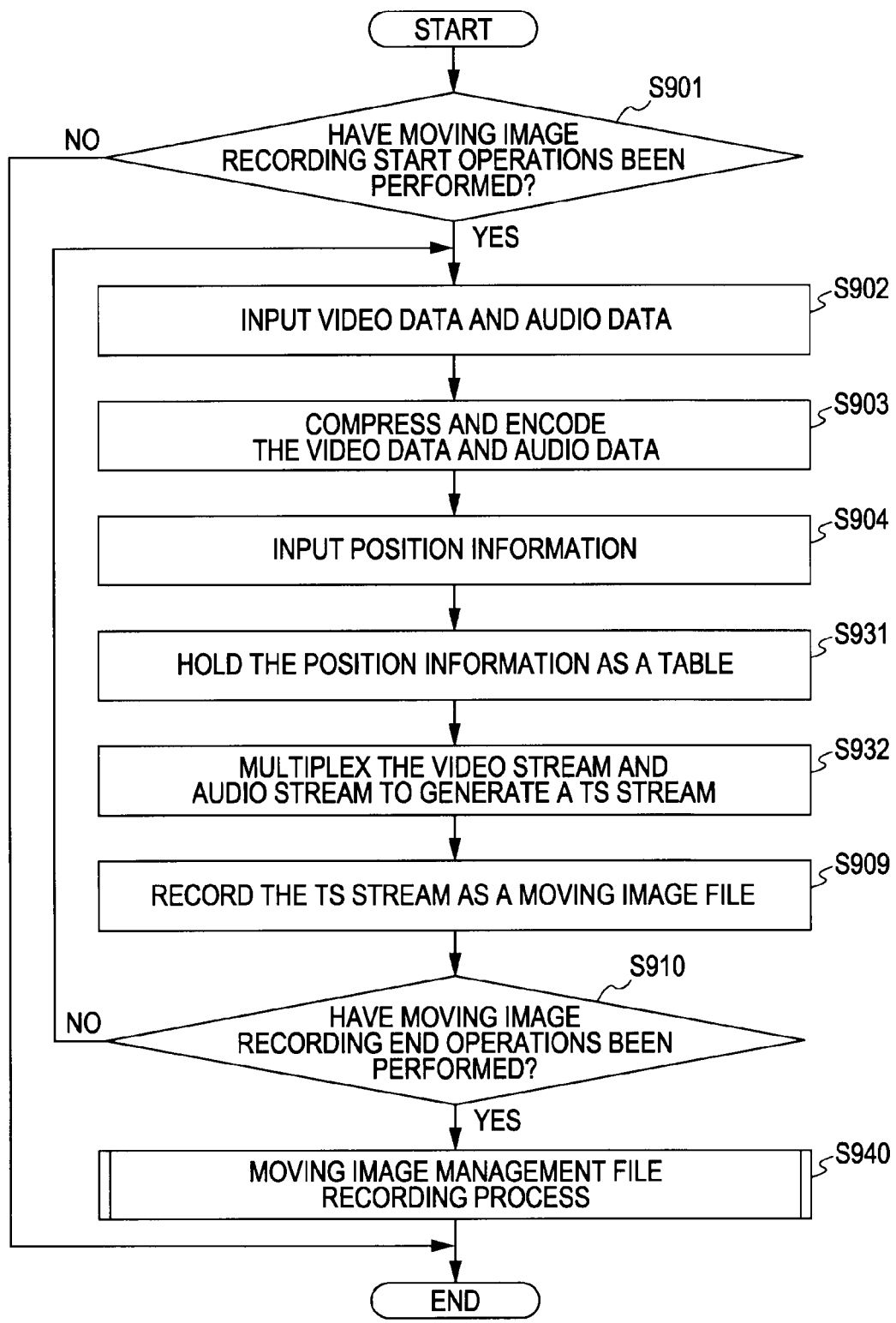
FIG. 23 is a flowchart illustrating the procedures of recording process of moving image and moving image management files executed by the information recording apparatus 100 according to an embodiment of the present invention.

FIG. 23 is a flowchart illustrating the procedure of the recording process of a moving image and moving image management file according to the information recording apparatus 100 according to an embodiment of the present invention. With this example, description will be made regarding an example wherein position information and text data are recorded in a clip information file and a movie playlist file according to the AVCHD standard. Note that this procedure is a modification of the procedure shown in FIG. 21. Therefore, steps S901 through S904, S909, and S910 shown in FIG. 23 are the same procedures as steps S901 through S904, S909, and S910 shown in FIG. 21, and accordingly, description thereof will be omitted here.

The position information output from the GPS signal processing unit 105 is input (step S904), and the management information processing unit 172 holds position information in the management information holding unit 173 as moving image management information (step S931) in a table format, so that chapter boundaries can be recognized. Subsequently, the multiplexing processing unit 174 multiplexes the compressed and encoded video stream and audio stream to generate a TS stream (step S932).

In a case where moving image recording end operations have been performed (step S910), moving image management file recording process is executed (step S940), and the operation of the recording process of a moving image and a moving image management file is ended. Note that the moving image management file recording process will be described in detail with reference to FIG. 24.

Figure 24:
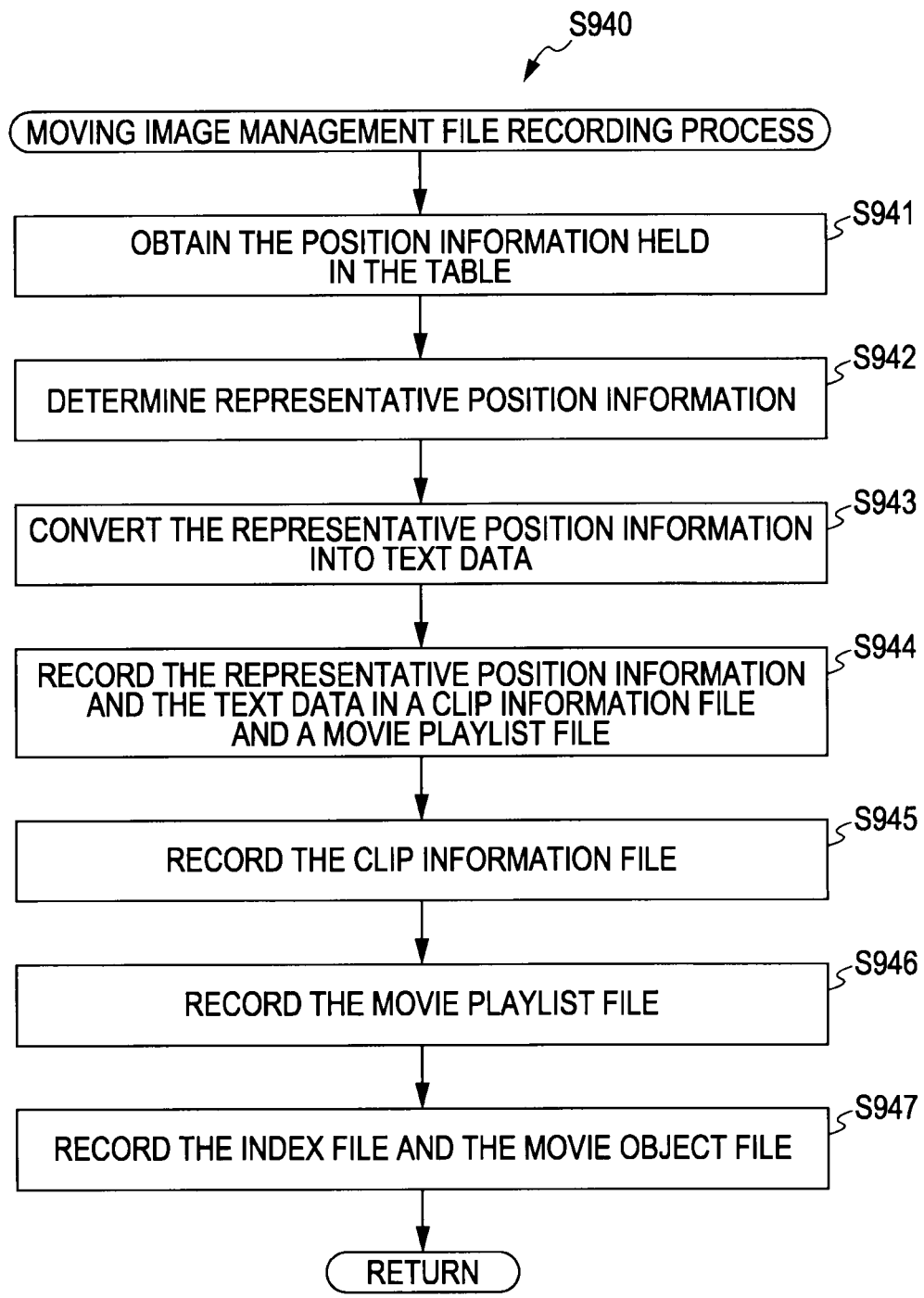
FIG. 24 is a flowchart illustrating a moving image management file recording procedure of the procedures of recording process of moving image and moving image management files executed by the information recording apparatus according to an embodiment of the present invention.

FIG. 24 is a flowchart illustrating the moving image management file recording procedure (procedure in step S940 shown in FIG. 23) of the recording procedures of a moving image file and a moving image management file by the information recording apparatus 100 according to an embodiment of the present invention.

First, the management information processing unit 172 obtains the position information held at the management information holding unit 173 as a table (step S941). Subsequently, the management information processing unit 172 determines representative position information that is representative position information from the obtained position information (step S942). For example, the first record of valid records within the table held for each chapter can be taken as the representative position information.

Subsequently, the position information processing unit 171 uses the conversion information stored in the position information conversion database 160 to convert the determined representative position information into text data (step S943). Note that step S943 is an example of the position information converting procedure that realizes a feature of the present invention.

Subsequently, the management information processing unit 172 records the determined representative position information, and the converted text data in a clip information file and a movie playlist file (step S944). Note that step S944 is an example of the moving image management information generating procedure that realizes a feature of the present invention. Subsequently, the recording control unit 176 records the clip information file in which the representative position information and text data have been recorded by the management information processing unit 172, in the recording medium 180 (step S945). Subsequently, the recording control unit 176 records the movie playlist file in which the representative position information and text data have been recorded by the management information processing unit 172, in the recording medium 180 (step S946). Note that steps S945 and S946 are an example of the recording control procedure that realizes a feature of the present invention. Subsequently, the recording control unit 176 records the index file and the movie object file in the recording medium 180 (step S947).

Next, description will be made in detail regarding an example wherein position information, and bitmap data or text data converted from the position information are used to create a menu screen, with reference to the drawing.

Figure 25:
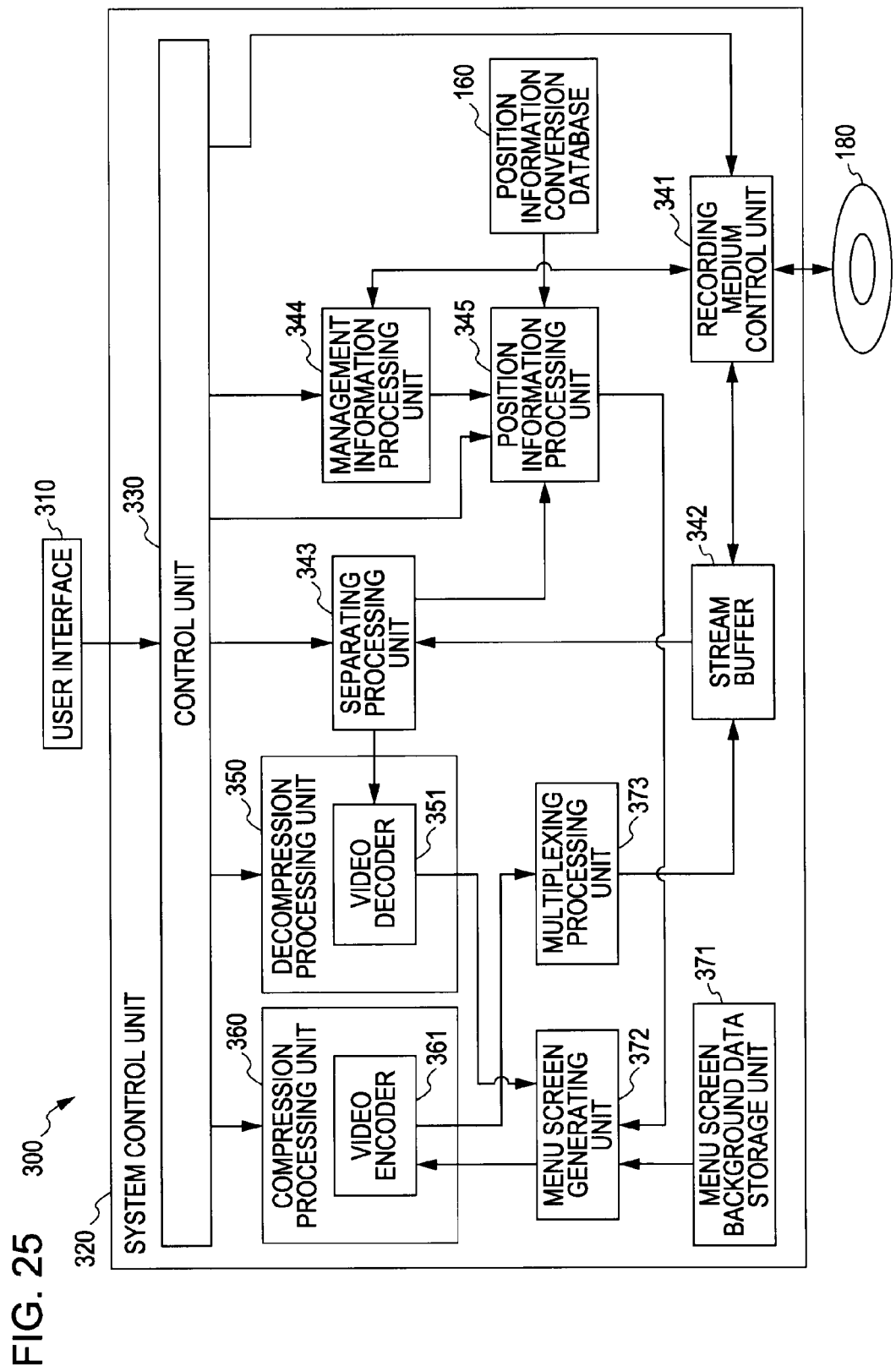
FIG. 25 is a diagram illustrating a functional configuration example of an information recording apparatus 300 according to an embodiment of the present invention.

FIG. 25 is a diagram illustrating a functional configuration example of an information recording apparatus 300 according to an embodiment of the present invention. The information recording apparatus 300 includes a user interface 310, a system control unit 320, and a recording medium 180. The recording medium 180 is the same as the recording medium 180 shown in FIGS. 1 and 2, and is accordingly denoted with the same reference numeral, and description thereof will be omitted. The information recording apparatus 300 can be realized by, for example, a digital video camera or a personal computer or the like which can subject a moving image file stored in the recording medium 180 to various types of image processing.

The user interface 310 is a user interface that accepts operating content input by the user, and outputs a control signal corresponding to the accepted operating content to the system control unit 320. An operating member, for example, such as a menu screen creation instructing button or the like is included in the information recording apparatus 300. The menu screen creation instructing button is a button which is pressed at the time of creating a menu screen relating to a moving image file stored in the recording medium 180. Note that the user interface 310 may be configured as a touch panel, for example.

The system control unit 320 generates a menu screen according to a predetermined moving image recording format regarding a moving image file stored in the recording medium 180 based on the control signal output from the user interface 310. Subsequently, the system control unit 320 records the generated menu screen in the recording medium 180 as a moving image file. As this moving image recording format, for example, a moving image recording format according to the AVCHD standard may be employed. The system control unit 320 includes a control unit 330, a position information conversion database 160, a recording medium control unit 341, a stream buffer 342, a separating processing unit 343, a position information processing unit 345, and a management information processing unit 344. Also, the system control unit 320 includes a decompression processing unit 350, a compression processing unit 360, a menu screen background data storage unit 371, a menu screen generating unit 372, and a multiplexing processing unit 373.

The control unit 330 controls subordinate modules, and executes a menu screen creating sequence. The control unit 330 is configured of, for example, a CPU, RAM, ROM, and so forth. Also, the control unit 330 controls each unit of the system control unit 320 by using the RAM as work memory, based on a program and data stored in the ROM beforehand, in accordance with the control signal output from the user interface 310. For example, in a case where a pressing operation as to the menu screen creation instructing button has been accepted by the user interface 310, the control unit 330 executes control to create a menu screen.

The recording medium control unit 341 executes control of recording or readout as to the recording medium 180 based on the control of the control unit 330. That is to say, the recording medium control unit 341 reads out a moving image file and a moving image management file stored in the recording medium 180, outputs the AV stream corresponding to the moving image file to the stream buffer 342, and outputs the moving image management file to the management information processing unit 344. Also, the recording medium control unit 341 records the AV stream stored in the stream buffer 342 in the recording medium 180 as a menu moving image file.

For example, in a case where a pressing operation as to the menu screen creation instructing button has been accepted by the user interface 310, a readout operation to read out a moving image file and a moving image management file from the recording medium 180 is started based on the control of the control unit 330. Subsequently, the menu screen data generated by the menu screen generating unit 372 is compressed and encoded by the video encoder 361, and the compressed and encoded menu screen data is packetized and multiplexed by the multiplexing processing unit 373 in a predetermined format. Subsequently, the data stream of the generated menu screen is supplied to the recording medium control unit 341 via the stream buffer 342, and is recorded in the recording medium 180 as a menu moving image file.

The stream buffer 342 is a buffer which temporarily stores a data stream of the moving image file output from the recording medium control unit 341, wherein the stored data streams of the moving image file are supplied to the separating processing unit 343 sequentially. Also, the stream buffer 342 temporarily stores a data stream output from the multiplexing processing unit 373, wherein the stored data streams are recorded in the recording medium 180 based on the control of the recording medium control unit 341.

The separating processing unit 343 separates the data stream supplied from the stream buffer 342 into a video stream, an audio stream, a bitmap stream, and a private stream. Subsequently, the separating processing unit 343 outputs the separated video stream to the decompression processing unit 350, and outputs the separated bitmap stream and private stream to the position information processing unit 345.

The management information processing unit 344 obtains the position information, and text data and bitmap data relating to a place, included in the moving image management file output from the recording medium control unit 341. Subsequently, the management information processing unit 344 outputs the obtained position information, text data, and bitmap data to the position information processing unit 345. For example, in the case of employing the moving image recording format according to the AVCHD standard as the moving image recording format, the position information, and text data relating to a place, included in a playlist file and a clip information file are obtained.

The position information processing unit 345 obtains text data or bitmap data relating to a place based on the bitmap stream and private stream output from the separating processing unit 343. For example, in the case of employing the moving image recording format according to the AVCHD standard as the moving image recording format, the bitmap data included in the bitmap stream is obtained. Also, the position information processing unit 345 obtains the position information, text data, and bitmap data output from the management information processing unit 344. Subsequently, the position information processing unit 345 converts the obtained position information into text data or bitmap data relating to a place by using the position information conversion database 160. Also, the position information processing unit 345 outputs the obtained text data or bitmap data relating to a place, or the converted text data or bitmap data relating to a place to the menu screen generating unit 372. Note that the position information conversion database 160 is the same as that shown in FIG. 2, so the same reference numeral is appended thereto, and description thereof will be omitted here.

The decompression processing unit 350 includes a video decoder 351. The video decoder 351 decodes the video stream output from the separating processing unit 343 by a predetermined decoding system. Also, the decompression processing unit 350 decompresses the representative image of each chapter making up the decoded video stream, and outputs this representative image to the menu screen generating unit 372. As this representative image, for example, the top I picture of each chapter making up a video stream can be selected.

The menu screen background data storage unit 371 stores the background screen of the menu screen generated by the menu screen generating unit 372, and supplies the stored background screen to the menu screen generating unit 372. This background screen is, for example, a screen including an area other than the areas of place names 387 through 392 and representative images 381 through 386 of a menu screen 380 shown in FIG. 26.

The menu screen generating unit 372 generates a menu screen relating the moving image file read out from the recording medium 180, and outputs the generated menu screen to the compression processing unit 360. For example, the menu screen generating unit 372 compounds the representative image output from the decompression processing unit 350 to the representative image display area of the background screen supplied from the menu screen background data storage unit 371. Also, the menu screen generating unit 372 compounds the text data or bitmap data relating to a place output from the position information processing unit 345 to the place display area of the background screen supplied form the menu screen background data storage unit 371. Subsequently, the menu screen generating unit 372 outputs the menu screen where the representative image and the text data or bitmap data are compounded, to the compression processing unit 360.

The compression processing unit 360 includes a video encoder 361. The video encoder 361 compresses and encodes the digital video data of the menu screen output from the menu screen generating unit 372 by a predetermined compression encoding system, and subsequently, supplies the compressed and encoded digital video data to the multiplexing processing unit 373 as a video stream.

The multiplexing processing unit 373 multiplexes the video streams output from the compression processing unit 360 by a predetermined system to output this as one AV stream. Subsequently, the multiplexed AV stream is output to the stream buffer 342. Subsequently, the data streams stored in the stream buffer 342 are recorded in the recording medium 180 by the recording medium control unit 341 as a menu moving image file.

Figure 26:
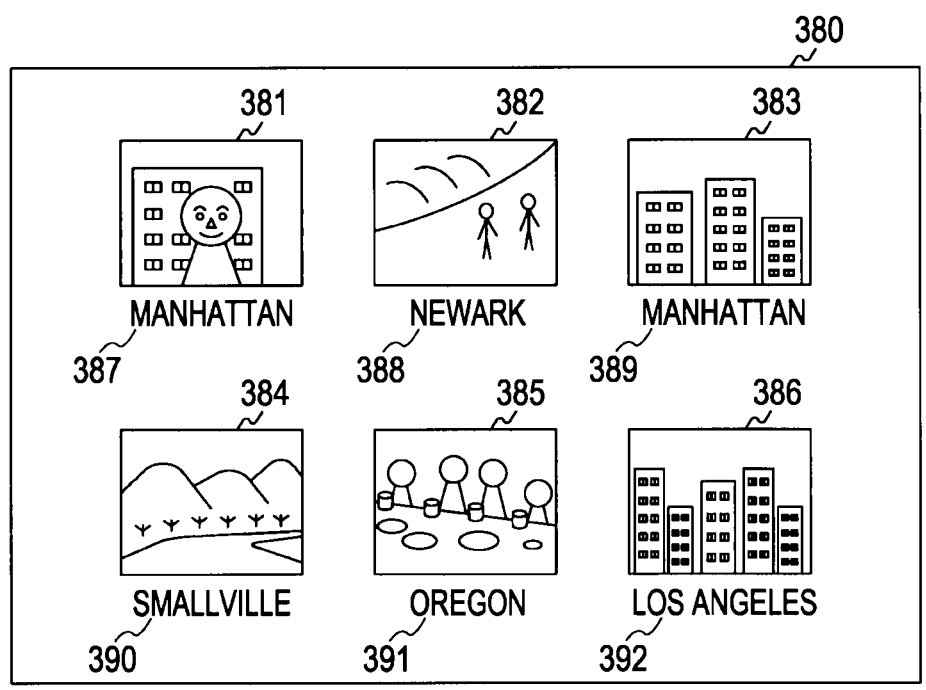
FIG. 26 is a diagram illustrating an example of a menu screen generated by a menu screen generating unit according to an embodiment of the present invention.

FIG. 26 is a diagram illustrating an example of the menu screen generated by the menu screen generating unit 372 according to an embodiment of the present invention. The menu screen 380 is a menu screen that displays six representative images on one screen. That is to say, the menu screen 380 is a screen where representative images 381 through 386, and characters 387 through 392 relating to the places corresponding thereto are compounded on the background screen of the menu screen stored in the menu screen background data storage unit 371. The representative images 381 through 386 are representative images of a chapter making up a moving image file stored in the recording medium 180. Also, the characters 387 through 392 are text data or bitmap data relating to the places corresponding to the representative images 381 through 386. This example illustrates an example wherein representative images, and characters corresponding to the representative images are compounded, but for example, in a case where a symbol marks are stored as bitmap data, representative images, and the symbol marks corresponding to the representative images may be compounded. Thus, a menu screen where text data or bitmap data relating to a place has been compounded is generated and stored beforehand, whereby, for example, even in a case where playback is performed with a playback apparatus having no conversion database to convert the GPS information into data such as a place or the like, a moving image list screen including characters relating to places can be displayed. Also, even in a state before an AV stream is decoded, a moving image list screen including characters relating to places can be displayed.

Next, description will be made in detail regarding an example wherein the bitmap data or text data recorded in a moving image file or moving image management file is played, with reference to the drawing.

Figure 27:
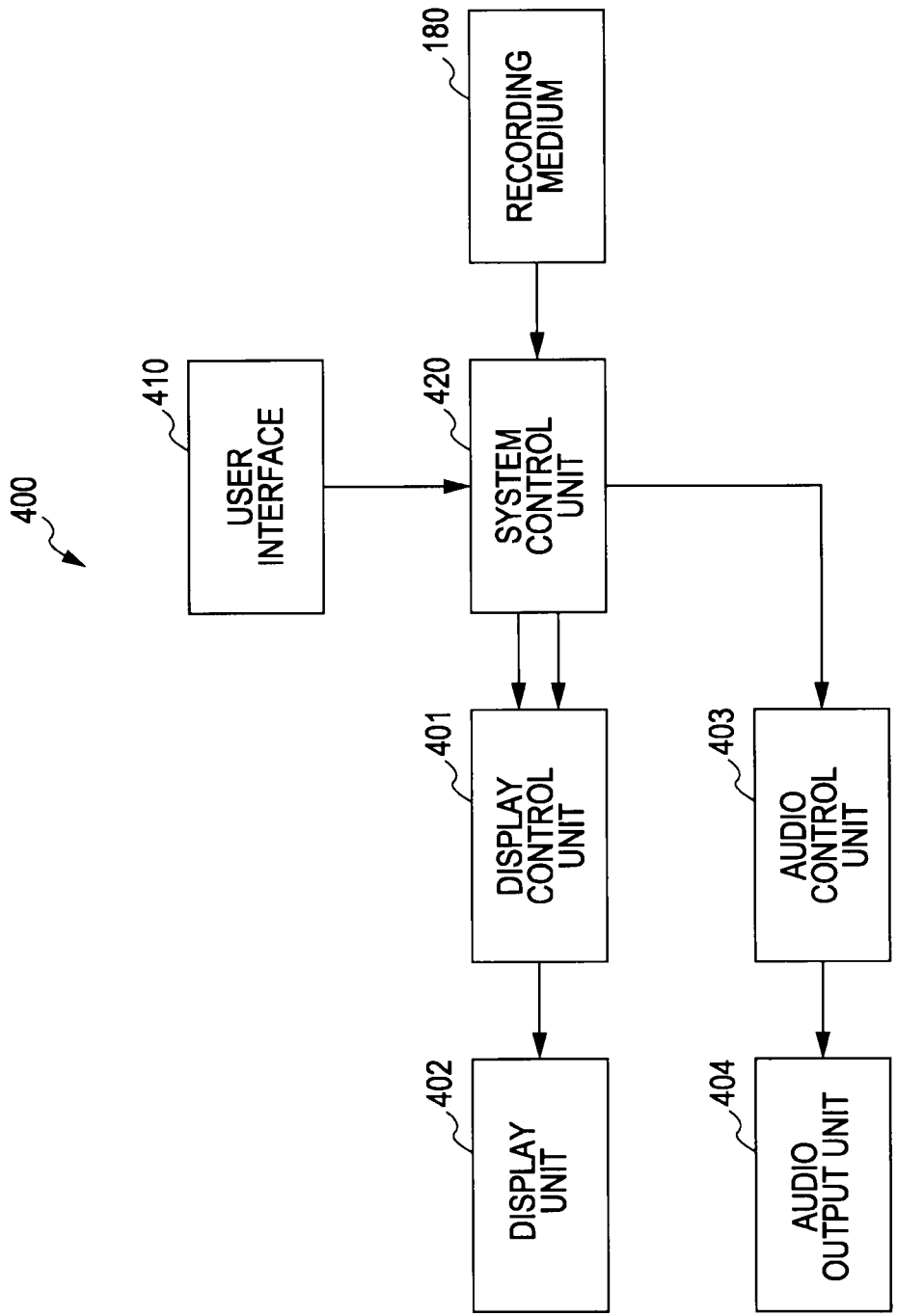
FIG. 27 is a block diagram illustrating a functional configuration example of a playback apparatus 400 according to an embodiment of the present invention.

FIG. 27 is a block diagram illustrating a functional configuration example of a playback apparatus 400 according to an embodiment of the present invention. The playback apparatus 400 includes a display control unit 401, a display unit 402, an audio control unit 403, and an audio output unit 404, a user interface 410, a system control unit 420, and a recording medium 180. The recording medium 180 is the same as the recording medium 180 shown in FIGS. 1 and 2, so the same reference numeral is appended thereto, and description thereof will be omitted here. The playback apparatus 400 can be realized by, for example, a playback apparatus such as a personal computer which can generate a moving image file recorded by an imaging apparatus such as a digital video camera or the like.

The display control unit 401 executes control to display a moving image or the like on the display unit 402 based on the digital video data output from the system control unit 420. For example, in a case where the digital video data of the menu screen from the system control unit 420 is output, the display control unit 401 displays this menu screen on the display unit 402.

The display unit 402 displays the moving image and menu screen corresponding to a moving image file stored in the recording medium 180, and so forth based on the control from the display control unit 401. The display unit 402 can be realized by, for example, the display of a personal computer or a television.

The audio control unit 403 executes control to output audio to the audio output unit 404 based on the digital audio data output from the system control unit 420.

The audio output unit 404 outputs the audio information of the moving image corresponding to a moving image file stored in the recording medium 180 based on the control from the audio control unit 403. The audio output unit 404 can be realized by, for example, a speaker.

The user interface 410 is a user interface that accepts operating content input by the user, and outputs the control signal corresponding to the accepted operating content to the system control unit 420. For example, operating members, such as a moving image playback mode set/cancel button, and a playback button, are included in the playback apparatus 400. The moving image playback mode set/cancel button is a button to be pressed at the time of setting or canceling a moving image playback mode that enables playback of a moving image. The playback button is a button to be pressed at the time of starting or ending playback of a moving image in the case of the moving image playback mode being set. Note that, the user interface 410 may be configured as, for example, a touch panel.

The system control unit 420 executes playback control of a moving image or the like based on the control signal output from the user interface 410. Note that description will be made in detail regarding the system control unit 420 with reference to FIG. 28.

Figure 28:
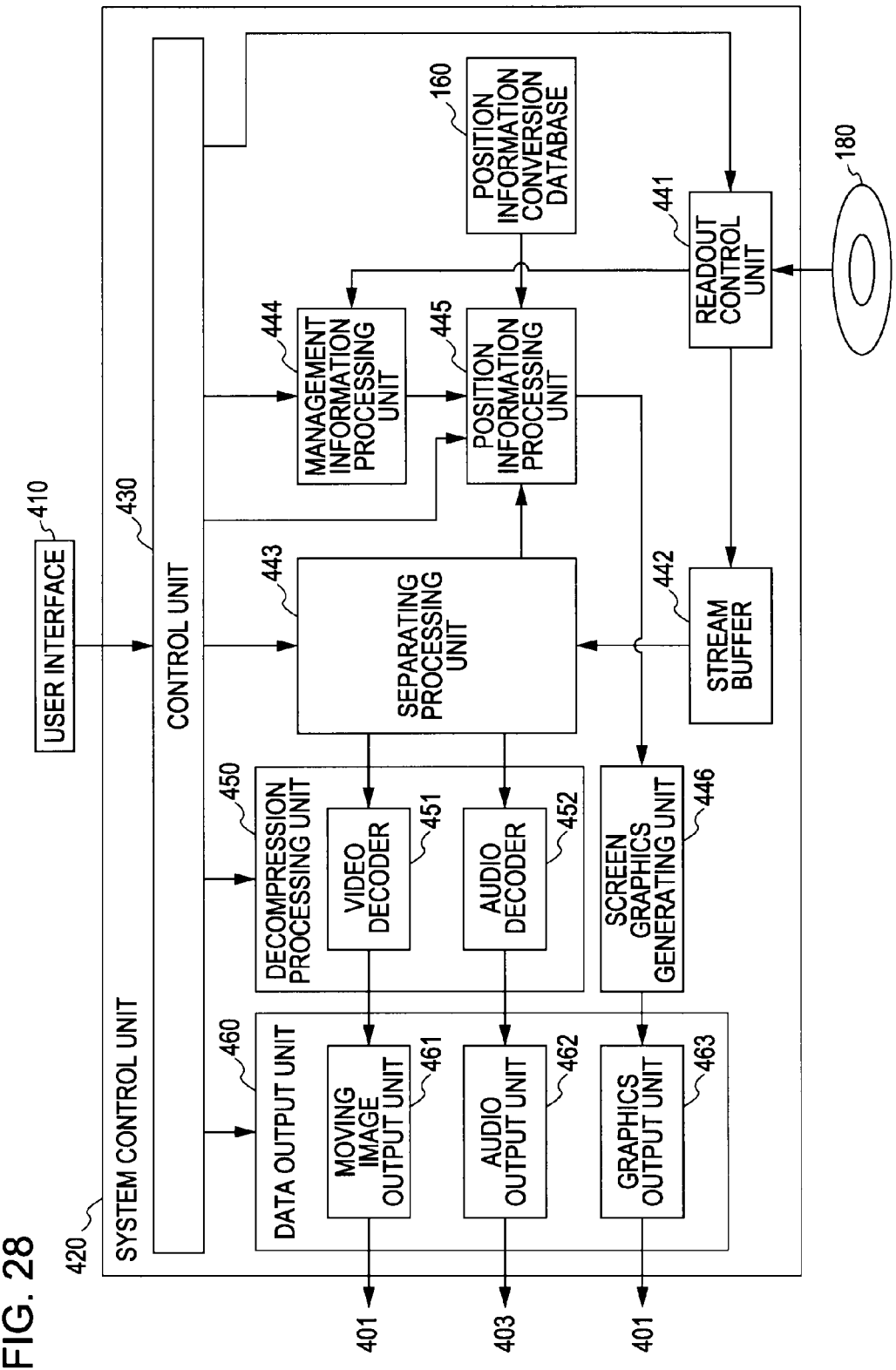
FIG. 28 is a block diagram illustrating a functional configuration example of a system control unit according to an embodiment of the present invention.

FIG. 28 is a block diagram illustrating a functional configuration example of the system control unit 420 according to an embodiment of the present invention. The system control unit 420 includes a position information conversion database 160, a control unit 430, a readout control unit 441, a stream buffer 442, and a separating processing unit 443. Also, the system control unit 420 includes a management information processing unit 444, a position information processing unit 445, a screen graphics generating unit 446, a decompression processing unit 450, and a data output unit 460.

The control unit 430 controls subordinate modules, and executes a moving image playback sequence. The control unit 430 is configured of, for example, a CPU, RAM, ROM, and so forth. Also, the control unit 430 controls each unit of the system control unit 420 by using the RAM as work memory, based on a program and data stored in the ROM beforehand, in accordance with the control signal output from the user interface 410. For example, in a case where a pressing operation as to the moving image playback mode set/cancel button has been accepted by the user interface 410, the control unit 430 executes control to set the moving image playback mode. Also, in a case where a pressing operation as to the moving image playback mode set/cancel button has been accepted by the user interface 410 in a state in which the moving image playback mode has been set, the control unit 430 executes control to play a moving image.

The readout control unit 441 executes control to read out a moving image file and a moving image management file stored in the recording medium 180 based on the control of the control unit 430. Subsequently, the readout control unit 441 outputs an AV stream corresponding to the read moving image file to the stream buffer 442, and outputs the moving image management file to the management information processing unit 444. For example, in a case where a pressing operation as to the playback button has been accepted by the user interface 410 in a state in which the moving image playback mode has been set, a readout operation to read out a moving image file and a moving image management file from the recording medium 180 is started based on the control of the control unit 430.

The stream buffer 442 is a buffer which temporarily stores an AV stream of the moving image file output from the readout control unit 441, wherein the stored AV streams of the moving image file are supplied to the separating processing unit 443 sequentially.

The separating processing unit 443 separates the AV stream supplied from the stream buffer 442 into a video stream, an audio stream, a bitmap stream, and a private stream. Subsequently, the separating processing unit 443 outputs the separated video stream to the decompression processing unit 450, and outputs the separated bitmap stream and private stream to the position information processing unit 445.

The management information processing unit 444 obtains the position information, and text data and bitmap data relating to a place, included in the moving image management file output from the readout control unit 441. Subsequently, the management information processing unit 444 outputs the obtained position information, text data, and bitmap data to the position information processing unit 445. For example, in the case of employing the moving image recording format according to the AVCHD standard as the moving image recording format, the position information, and text data relating to a place, included in a playlist file and a clip information file are obtained.

The position information processing unit 445 obtains text data or bitmap data relating to a place based on the bitmap stream and private stream output from the separating processing unit 443. For example, in the case of employing the moving image recording format according to the AVCHD standard as the moving image recording format, the bitmap data corresponding to the bitmap stream is obtained. Also, the position information processing unit 445 converts the position information output from the management information processing unit 444 into text data or bitmap data relating to a place, using the position information conversion database 160. Also, the position information processing unit 445 outputs the text data or bitmap data relating to a place output from the management information processing unit 444, or the converted text data or bitmap relating to a place to the screen graphics generating unit 446. Note that the position information conversion database 160 is the same as that shown in FIG. 2, so the same reference numeral is appended thereto, and description thereof will be omitted here.

The decompression processing unit 450 includes a video decoder 451, and an audio decoder 452. The video decoder 451 decodes the video stream output from the separating processing unit 443 by a predetermined decoding system, and outputs the decoded digital video data to the moving image output unit 461. The audio decoder 452 decodes the audio stream output from the separating processing unit 443 by a predetermined decoding system, and outputs the decoded digital audio data to the audio output unit 462.

The screen graphics generating unit 446 generates graphics such as a menu screen or the like to be displayed on the display unit 402 at the time of playing the moving image file read out from the recording medium 180, and outputs the generated graphics to the data output unit 460. For example, the screen graphics generating unit 446 compounds the text data or bitmap data relating to a place output from the position information processing unit 445 to the moving image list screen. A display example of this moving image list screen will be described in detail with reference to FIG. 29.

The data output unit 460 includes a moving image output unit 461, an audio output unit 462, and a graphics output unit 463. The moving image output unit 461 outputs the digital video data output from the video decoder 451 to the display control unit 401. The audio output unit 462 outputs the digital audio data output from the audio decoder 452 to the audio control unit 403. The graphics output unit 463 outputs the graphics output from the screen graphics generating unit 446 to the display control unit 401.

Figure 29A:
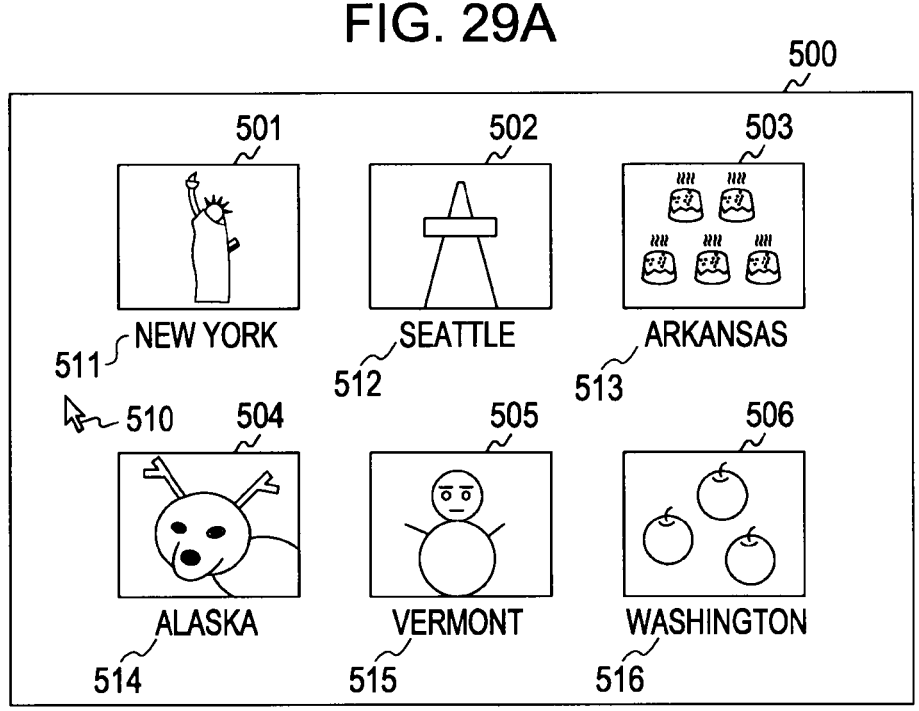
FIGS. 29A and 29B are diagrams illustrating a display example of a display screen displayed by the playback apparatus according to an embodiment of the present invention.
Figure 29B:
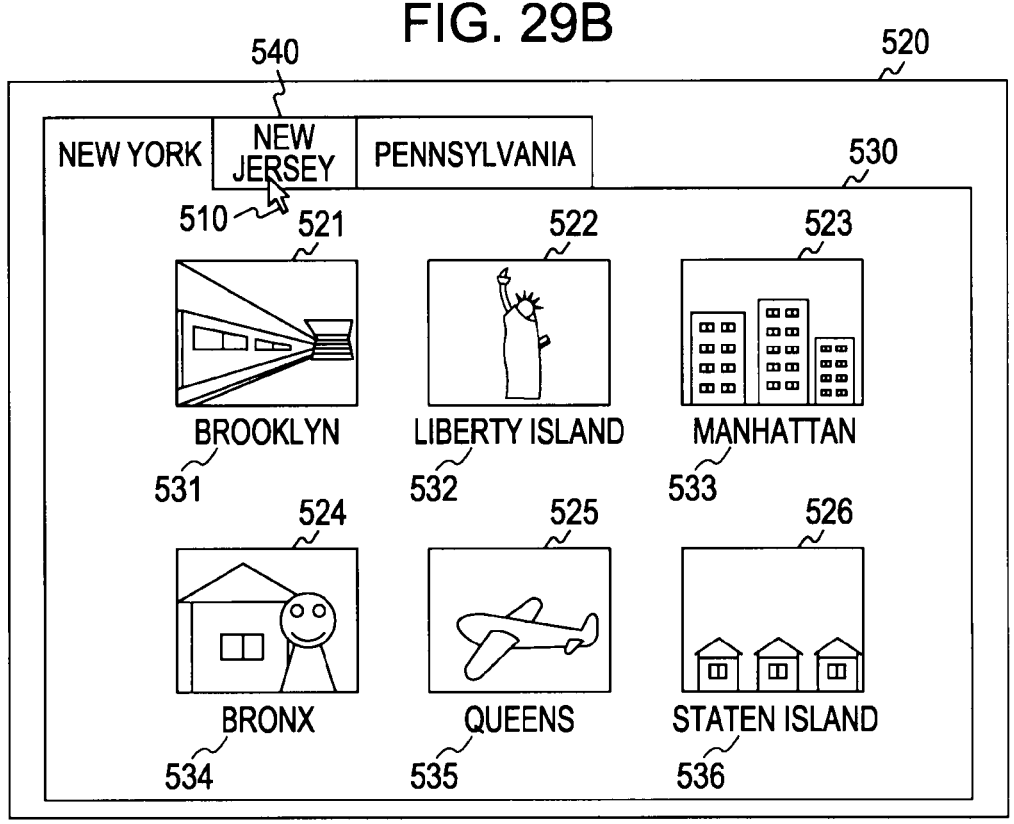

FIGS. 29A and 29B are diagrams illustrating a display example of the display screen to be displayed by the playback apparatus 400 according to an embodiment of the present invention. FIG. 29A illustrates an example wherein as an indicator that indicates a moving image file, characters that indicate a place relating to the moving image file thereof, and a symbol mark relating to the place thereof are displayed simultaneously. Note that let us say that characters that indicate a place have been recorded as text data, and a symbol relating to a place has been recorded as bitmap data. Also, such data may be recorded in either a moving image file or a moving image management file. For example, symbol marks 501 through 506 relating to a place are displayed, and state names 511 through 516 are displayed as characters that indicate places corresponding to the symbol marks 501 through 506. With the example shown in FIG. 29A, for example, New York 511 that is a state name, and an image 501 that indicates the statue of liberty which is a symbol mark relating to New York, are displayed as indicators that indicate a moving image file recorded within New York. Also, for example, in a case where operating input of clicking the image 501 or New York 511 by a cursor 510 has been accepted by the user interface 410, playback of the moving image file corresponding to the image 501 or New York 511 is started.

FIG. 29B illustrates a display example of an index screen generated for each area based on the position information and so forth stored in a moving image management file. For example, a playback screen 520 is displayed wherein one of a New York index screen, a New Jersey index screen, and a Pennsylvania index screen can be displayed. The New York index screen 530 shown in FIG. 29B is a screen where a list of moving image files recorded within New York is displayed. For example, in a case where operating input of clicking a New Jersey tab 540 disposed on the upper portion of the New York index screen by the cursor 510 has been accepted by the user interface 410, the New Jersey index screen is displayed. Also, images 521 through 526 displayed on the New York index screen 530 are, for example, representative thumbnail images extracted from the corresponding moving image files. Also, for example, in a case where operating input of clicking the image 521 or a Brooklyn 531 by the cursor 510 has been accepted by the user interface 410, playback of the moving image file corresponding to the image 521 or Brooklyn 531 is started.

Note that, with the above-described embodiments of the present invention, description has been made so far assuming that the information recording apparatuses 100, 300, and 400 are different apparatuses, but the above-described embodiments of the present invention may be realized with the same apparatus having these functional configurations.

As described above, according to the above embodiment of the present invention, even in a case where a moving image file is moved to another playback apparatus, text data or bitmap data relating to a place where the moving image thereof has been imaged, can be displayed. For example, even in a case where playback is executed with a playback apparatus having neither a conversion database used for converting the GPS information into bitmap data such as a place name and so forth, nor a conversion map, text data or bitmap thereof can be displayed.

Also, according to the above embodiment of the present invention, even in a state before an AV stream is decoded, text data or bitmap relating to a place where a moving image to be played has been imaged, can be displayed. That is to say, the content of the moving image to be played can be understood quickly. Also, for example, in a case where a moving image file is moved to a playback apparatus having no decoder which decodes an AV stream, text data or bitmap relating to a place where the moving image thereof has been imaged, can be displayed.

Note that, with the above embodiment of the present invention, description has been made regarding the case where position information is calculated based on the GPS signal, but position information may be obtained by another position information obtaining method. For example, an arrangement may be made wherein access point information of a wireless LAN (Local Area Network) which exists nearby is used to derive position information, and this position information is used.

Also, the above embodiment of the present invention may be applied to other information recording apparatuses such as a cellular phone or the like whereby position information can be obtained, and a moving image can be recorded.

Note that the above-described embodiments of the present invention illustrate an example of carrying out the present invention, in relation with the features of the present invention, as described above. However, the present invention is not restricted to the above embodiments, and various modifications can be made without departing from the essence of the present invention.

Also, the procedures described with the above embodiments may be taken as a method having these series of procedures, or may be taken as a program through a recording medium which stores the program thereof to cause a computer to execute these series of procedures. Examples of this recording medium include CD (Compact Disc), MD (MiniDisc), DVD (Digital Versatile Disk), memory card, and Blu-ray Disc (registered trademark).

The present application contains subject matter related to that disclosed in Japanese Priority Patent Application JP 2008-206954 filed in the Japan Patent Office on Aug. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording apparatus comprising:
a moving image input unit configured to input a moving image;
a location information obtaining unit configured to obtain location information at the time of said moving image being input;
a location information converting unit configured to convert said obtained location information into at least either bitmap data or text data, relating to a place determined with the location information thereof;
a transport data stream generating unit configured to generate a transport data stream by multiplexing video data corresponding to said input moving image with said converted bitmap data or text data; and
a recording control unit configured to record said generated transport data stream as a moving image file,
wherein said transport data stream generating unit generates said transport data stream based on said video stream in which at least said converted text data is included in a modified digital video pack according to the AVCHD standard, and
wherein the transport data stream generating unit is further configured to generate the transport data stream by multiplexing video data corresponding to said input moving image along with both position information and said converted bitmap or text data.

2. The information recording apparatus according to claim 1, wherein said location information converting unit converts said obtained location information into text data relating to a place determined with the location information thereof;
and wherein said transport data stream generating unit generates said transport data stream by including said converted text data in a video stream corresponding to said video data.

3. The information recording apparatus according to claim 1, wherein said location information converting unit converts said obtained location information into bitmap data relating to a place determined with the location information thereof;
and wherein said transport data stream generating unit generates said transport data stream by multiplexing a bitmap stream corresponding to said converted bitmap data, and a video stream corresponding to said video data.

4. The information recording apparatus according to claim 3, wherein said bitmap stream is a bitmap stream corresponding to an overlay bitmap according to the AVCHD standard;
and wherein said transport data stream generating unit generates said transport data stream by multiplexing said bitmap stream and said video stream in accordance with the AVCHD standard.

5. The information recording apparatus according to claim 1, wherein said location information converting unit converts said obtained location information into bitmap data corresponding to at least one of a place name, a city name, a country name, a symbol mark, and numeric value information that represent a place determined with the location information thereof.

6. The information recording apparatus according to claim 1, wherein said location information converting unit converts said obtained location information into text data corresponding to at least one of a place name, a city name, a country name, and numeric value information that represent a place determined with the location information thereof.

7. The information recording apparatus according to claim 1, wherein said location information converting unit converts said obtained location information into at least one of bitmap data that indicates a map including a place determined with the location information thereof, and bitmap data in which an indicator that indicates the place thereof is drawn on a map including the place determined with the location information thereof.

8. The information recording apparatus according to claim 1, wherein said modified digital video pack, generated according to the AVCHD standard, is stored in an elementary stream (ES) of video data as user data.

9. The information recording apparatus according to claim 8, wherein said modified digital video pack, generated according to the AVCHD standard, includes a type indicator indicating that the user data is modified digital video pack metadata.

10. An imaging apparatus comprising:
an imaging unit configured to image a subject to generate an imaged moving image;
a location information obtaining unit configured to obtain location information at the time of said imaged moving image being generated;
a location information converting unit configured to convert said obtained location information into at least either bitmap data or text data, relating to a place determined with the location information thereof;
a transport data stream generating unit configured to generate a transport data stream by multiplexing video data corresponding to said input moving image with said converted bitmap data or text data; and
a recording control unit configured to record said generated transport data stream as a moving image file,
wherein said transport data stream generating unit generates said transport data stream based on said video stream in which at least said converted text data is included in a modified digital video pack according to the AVCHD standard, and
wherein the transport data stream generating unit is further configured to generate the transport data stream by multiplexing video data corresponding to said input moving image along with both position information and said converted bitmap or text data.

11. An information recording method comprising the steps of:
inputting a moving image;
obtaining location information at the time of said moving image being input;
converting said obtained location information into at least either bitmap data or text data, relating to a place determined with the location information thereof;
generating a transport data stream by multiplexing video data corresponding to said input moving image with said converted bitmap data or text data; and
recording said generated transport data stream as a moving image file,
wherein said generating further generates said transport data stream based on said video stream in which at least said converted text data is included in a modified digital video pack according to the AVCHD standard, and
wherein the generating further generates the transport data stream by multiplexing video data corresponding to said input moving image along with both position information and said converted bitmap or text data.

12. A non-transitory computer readable medium having stored thereon a program that when executed by a computer causes the computer to execute the steps of:
inputting a moving image;
obtaining location information at the time of said moving image being input;
converting said obtained location information into at least either bitmap data or text data, relating to a place determined with the location information thereof;
generating a transport data stream by multiplexing video data corresponding to said input moving image with said converted bitmap data or text data; and
recording said generated transport data stream as a moving image file,
wherein said generating further generates said transport data stream based on said video stream in which at least said converted text data is included in a modified digital video pack according to the AVCHD standard, and
wherein the generating further generates the transport data stream by multiplexing video data corresponding to said input moving image along with both position information and said converted bitmap or text data.

\* \* \* \* \*